(12) United States Patent
Anderson et al.

(10) Patent No.: US 9,709,969 B2
(45) Date of Patent: Jul. 18, 2017

(54) METHODS AND APPARATUS TO CONTROL MACHINE CONFIGURATIONS

(71) Applicant: Deere & Company, Moline, IL (US)

(72) Inventors: Noel Wayne Anderson, Fargo, ND (US); Bryan Kirk Buerkle, Cedar Falls, IA (US); Niels Dybro, Sherrard, IL (US)

(73) Assignee: DEERE & COMPANY, Moline, IL (US)

( * ) Notice: Subject to any disclaimer, the term of this patent is extended or adjusted under 35 U.S.C. 154(b) by 771 days.

(21) Appl. No.: 13/841,183

(22) Filed: Mar. 15, 2013

(65) Prior Publication Data

US 2014/0277675 A1    Sep. 18, 2014

(51) Int. Cl.
| | |
|---|---|
| G05B 15/00 | (2006.01) |
| G05B 15/02 | (2006.01) |
| G05D 1/02 | (2006.01) |
| A01B 69/00 | (2006.01) |

(52) U.S. Cl.
CPC ............... *G05B 15/02* (2013.01); *A01B 69/00* (2013.01); *G05D 1/0212* (2013.01); *G05D 1/0295* (2013.01); *G05D 2201/0201* (2013.01)

(58) Field of Classification Search
CPC .............................. G05B 15/02; G05D 1/0212
USPC ......................................................... 700/114
See application file for complete search history.

(56) References Cited

U.S. PATENT DOCUMENTS

| | | | |
|---|---|---|---|
| 704,573 A | 7/1902 | Pintsch | |
| 1,766,163 A | 6/1930 | Vukosav | |
| 2,144,347 A | 1/1939 | Silver | |
| 3,208,535 A | 9/1965 | Fischer | |
| 3,797,602 A | 3/1974 | Sumida | |
| 4,180,133 A | 12/1979 | Collogan et al. | |
| 4,184,551 A | 1/1980 | Orthman | |
| 4,271,910 A | 6/1981 | Schafer | |
| 4,373,603 A | 2/1983 | Nelson | |
| 4,422,341 A | 12/1983 | Espiritu Santo et al. | |

(Continued)

FOREIGN PATENT DOCUMENTS

| | | |
|---|---|---|
| CA | 2457216 | 8/2004 |
| CN | 105075522 | 11/2015 |

(Continued)

OTHER PUBLICATIONS

International Searching Authority, "Search Report", issued in connection with PCT patent application No. PCT/US2013/066157, mailed on Jul. 21, 2014, 4 pages.

(Continued)

*Primary Examiner* — Kenneth M Lo
*Assistant Examiner* — Yuhui R Pan
(74) *Attorney, Agent, or Firm* — Hanley, Flight & Zimmerman, LLC

(57) ABSTRACT

Methods and apparatus are disclosed for controlling machine configurations. An example method disclosed herein includes identifying a machine configuration, the machine configuration comprising a host machine connected to an auxiliary machine; determining a desired trajectory based on at least one of the host machine turning, a desired work path, or an alignment of the host machine and the auxiliary machine; and controlling steering of the auxiliary machine based on a desired trajectory of the host machine.

26 Claims, 11 Drawing Sheets

(56) References Cited

U.S. PATENT DOCUMENTS

| | | |
|---|---|---|
| 4,463,811 A | 8/1984 | Winter |
| 4,549,448 A | 10/1985 | Kittle |
| 4,612,995 A | 9/1986 | Benedek et al. |
| 4,616,712 A | 10/1986 | Jorgensen |
| 4,640,365 A | 2/1987 | Schmidt |
| 4,640,368 A | 2/1987 | Kittle et al. |
| 4,821,807 A | 4/1989 | Trumm |
| 4,930,581 A | 6/1990 | Fleischer et al. |
| 5,025,866 A | 6/1991 | Schmidt et al. |
| 5,042,586 A | 8/1991 | Spencer et al. |
| 5,088,561 A | 2/1992 | Jurgena |
| 5,094,300 A | 3/1992 | Jurgena |
| 5,101,909 A | 4/1992 | VanGerpen |
| 5,109,707 A | 5/1992 | VanGerpen |
| 5,148,873 A | 9/1992 | Barnes et al. |
| 5,224,551 A | 7/1993 | Sukup |
| 5,255,756 A | 10/1993 | Follmer et al. |
| 5,392,863 A | 2/1995 | Fixemer |
| 5,487,002 A | 1/1996 | Diller et al. |
| 5,505,267 A | 4/1996 | Orbach et al. |
| 5,603,380 A | 2/1997 | Mansur |
| 5,684,691 A | 11/1997 | Orbach et al. |
| 5,767,663 A | 6/1998 | Lu |
| 5,813,472 A | 9/1998 | Fixemer |
| 5,823,270 A | 10/1998 | Cooper |
| 5,904,365 A * | 5/1999 | Dillon .................... B62D 59/02 180/14.1 |
| 5,910,810 A | 6/1999 | Brooks et al. |
| 5,911,769 A | 6/1999 | Orbach et al. |
| 5,913,917 A | 6/1999 | Murphy |
| 6,174,255 B1 | 1/2001 | Porter et al. |
| 6,216,072 B1 | 4/2001 | Boe et al. |
| 6,234,508 B1 | 5/2001 | Tuttle et al. |
| 6,487,477 B1 | 11/2002 | Woestman et al. |
| 6,528,959 B2 | 3/2003 | Kitano et al. |
| 6,612,245 B2 | 9/2003 | Kumar et al. |
| 6,631,916 B1 | 10/2003 | Miller |
| 6,728,607 B1 | 4/2004 | Anderson |
| 6,865,465 B2 | 3/2005 | McClure |
| 6,907,336 B2 | 6/2005 | Gray et al. |
| 6,975,997 B1 | 12/2005 | Murakami et al. |
| 7,054,731 B1 | 5/2006 | Lange et al. |
| 7,104,340 B1 | 9/2006 | Thompson et al. |
| 7,110,881 B2 | 9/2006 | Gray et al. |
| 7,142,956 B2 | 11/2006 | Heiniger et al. |
| 7,228,214 B2 | 6/2007 | Flann et al. |
| 7,369,938 B2 | 5/2008 | Scholl |
| 7,415,333 B2 | 8/2008 | Anderson |
| 7,505,848 B2 | 3/2009 | Flann et al. |
| 7,509,199 B2 | 3/2009 | Rekow |
| 7,512,486 B2 | 3/2009 | Needham et al. |
| 7,539,562 B2 | 5/2009 | Maguire et al. |
| 7,540,522 B2 | 6/2009 | Friggstad |
| 7,578,361 B2 | 8/2009 | Thacher |
| 7,650,961 B2 | 1/2010 | Smith et al. |
| 7,658,250 B2 | 2/2010 | Betz et al. |
| 7,743,859 B2 | 6/2010 | Forsyth |
| 7,783,417 B2 | 8/2010 | Vavrus |
| 7,806,210 B2 | 10/2010 | Proietty et al. |
| 7,848,876 B2 | 12/2010 | Simonds et al. |
| 7,848,880 B2 | 12/2010 | Cheung |
| 7,856,303 B2 | 12/2010 | Thompson et al. |
| 7,860,628 B2 | 12/2010 | Lange |
| RE42,036 E | 1/2011 | Dillon |
| 7,877,198 B2 | 1/2011 | Tenzer et al. |
| 7,880,436 B2 | 2/2011 | Fischer et al. |
| 7,881,863 B2 | 2/2011 | Uyeki et al. |
| 7,928,693 B2 | 4/2011 | Hafner et al. |
| 7,958,958 B2 | 6/2011 | de la Torre Bueno |
| 8,112,201 B2 | 2/2012 | Aral |
| 8,116,977 B2 | 2/2012 | Aral et al. |
| 8,190,337 B2 | 5/2012 | McClure et al. |
| 8,190,364 B2 | 5/2012 | Rekow |
| 8,214,111 B2 | 7/2012 | Heiniger et al. |
| 8,576,056 B2 | 11/2013 | Clair et al. |
| 9,037,346 B2 | 5/2015 | Keys, II et al. |
| 9,114,832 B2 | 8/2015 | Wang et al. |
| 9,232,688 B2 | 1/2016 | Kormann et al. |
| 2002/0095251 A1 | 7/2002 | Oh et al. |
| 2003/0029651 A1 | 2/2003 | Palmeri |
| 2006/0142936 A1 | 6/2006 | Dix |
| 2007/0145714 A1* | 6/2007 | Friggstad ..................... 280/444 |
| 2007/0193795 A1* | 8/2007 | Forsyth ..................... 180/65.4 |
| 2008/0086249 A1 | 4/2008 | Lange |
| 2008/0133120 A1 | 6/2008 | Romanick |
| 2008/0189033 A1 | 8/2008 | Geelen et al. |
| 2008/0195268 A1 | 8/2008 | Sapilewski et al. |
| 2008/0221787 A1 | 9/2008 | Vavrus |
| 2008/0228353 A1 | 9/2008 | Mayfield et al. |
| 2008/0262668 A1 | 10/2008 | Yamada |
| 2008/0270016 A1 | 10/2008 | Proietty et al. |
| 2008/0270023 A1 | 10/2008 | Kumar |
| 2009/0005974 A1 | 1/2009 | Lenneman et al. |
| 2009/0048053 A1 | 2/2009 | Ruppert et al. |
| 2009/0157289 A1 | 6/2009 | Graessley |
| 2009/0198398 A1 | 8/2009 | Yamada |
| 2009/0272551 A1 | 11/2009 | Thompson et al. |
| 2009/0319110 A1 | 12/2009 | Tani et al. |
| 2010/0006365 A1 | 1/2010 | Hasegawa et al. |
| 2010/0010732 A1 | 1/2010 | Hartman |
| 2010/0049397 A1 | 2/2010 | Liu et al. |
| 2010/0063651 A1 | 3/2010 | Anderson |
| 2010/0088012 A1 | 4/2010 | O'Sullivan et al. |
| 2010/0094481 A1 | 4/2010 | Anderson |
| 2010/0114473 A1 | 5/2010 | Kono et al. |
| 2010/0145609 A1 | 6/2010 | Boss et al. |
| 2010/0161166 A1 | 6/2010 | Yamada et al. |
| 2010/0174484 A1 | 7/2010 | Sivasubramaniam et al. |
| 2010/0211340 A1 | 8/2010 | Lowenthal et al. |
| 2010/0235076 A1 | 9/2010 | Ofek et al. |
| 2011/0054729 A1* | 3/2011 | Whitehead et al. ............ 701/29 |
| 2011/0112721 A1* | 5/2011 | Wang .................. A01B 69/004 701/41 |
| 2011/0162857 A1* | 7/2011 | Hendron .................. B66C 1/58 172/811 |
| 2011/0166774 A1 | 7/2011 | Schunder |
| 2011/0184642 A1 | 7/2011 | Rotz et al. |
| 2011/0258838 A1 | 10/2011 | McCabe et al. |
| 2011/0279255 A1 | 11/2011 | Miyoshi |
| 2011/0288765 A1 | 11/2011 | Conway |
| 2012/0035795 A1 | 2/2012 | Yu et al. |
| 2012/0112896 A1 | 5/2012 | Clair et al. |
| 2012/0273285 A1 | 11/2012 | Jensen et al. |
| 2013/0110358 A1 | 5/2013 | Merx et al. |
| 2014/0379230 A1 | 12/2014 | Koch et al. |

FOREIGN PATENT DOCUMENTS

| | | |
|---|---|---|
| DE | 3206403 | 9/1982 |
| DE | 3535225 | 4/1986 |
| DE | 102010015342 A1 | 10/2011 |
| EP | 1818245 | 8/2007 |
| EP | 2000377 | 12/2008 |
| EP | 2136183 | 12/2009 |
| EP | 2220924 A1 | 8/2010 |
| EP | 2243688 | 10/2010 |
| FR | 2692750 | 12/1993 |
| GB | 1076240 | 7/1967 |
| NL | EP 2540595 A1 * | 1/2013 ............. B62D 7/144 |
| WO | 2008112335 | 9/2008 |
| WO | 2010021982 | 2/2010 |
| WO | 2010046905 | 4/2010 |

OTHER PUBLICATIONS

Nternational Searching Authority, "Written Opinion", issued in connection with PCT patent application No. PCT/US2013/066157, mailed on Jul. 21, 2014, 6 pages.

2013 Honda CR-V, automobiles.honda.com/cr-v/price.aspx?Model=RM4H3DEW, retrieved from the internet on Aug. 9, 2013, 3 pages, Honda.

(56) References Cited

OTHER PUBLICATIONS

Tommi Pitenius, "Concept machine Valtra ANTS looks to the future," http://www.valtra.co.uk/news/4697.asp, Jan. 27, 2011, 2 pages, Valtra.
Yoshida et al., "Motion Dynamics and Control of a Planetary Rover With Slip-Based Traction Model," 2002, 12 pages, Japan.
"ProDrive propulsion system automatically shifts between two speed ranges as ground conditions change," http://salesmanual.deere.com/sales/salesmanual/en_NA/combines_headers/2012/feature/t670_combine/drives_axles/t670_prodrive_option.html, 1994-2012, 2 pages, Deere & Company.
"Rinspeed Dock+Go—Backpacks on Wheels for Electric Vehicles," http://www.rinspeed.eu/concept-detail.php?cid=1, 2013, 15 pages, Rinspeed AG.
Yoshida et al., "Slip-Based Traction Control of a Planetary Rover," 2002, 10 pages, Japan.
"Traction control system," en.wikipedia.org/wiki/Traction_control_system, retrieved from the internet on Aug. 9, 2013, 4 pages.
"Valtra ANTS—A concept for the future," http://www.valtra.com/news/4767.asp, Feb. 9, 2011, 2 pages, Valtra.
Pioneer Equipment, Inc., "Pioneer Farm Equipment PTO Carts," [http://www.pioneerfarmequipment.com/pioneer_pto_carts.htm], retrieved on Oct. 26, 2012, 3 pages.
The Straight Dope, "When multiple locomotives pull a train, why are they often pointing in opposite directions?" Mar. 11, 2003, [http://www.straightdope.com/columns/read/2080/when-multiple-locomotives-pull-a-train-why-are-they-often-pointing-in-opposite-directions], retrieved on Oct. 1, 2015, 2 pages.
Valtra, "Valtra Ants," [www.valtra60.com], retrieved on Oct. 1, 2015, 2 pages.
International Searching Authority, "Written Opinion", issued in connection with PCT Patent Application No. PCT/US2013/066161, mailed on Oct. 13, 2014, 9 pages.
International Searching Authority, "Search Report", issued in connection with PCT Patent Application No. PCT/US2013/066161, mailed on Oct. 13, 2014, 7 pages.
International Searching Authority, "International Preliminary Report on Patentability", issued in connection with PCT Patent Application No. PCT/US2013/066161, mailed on Sep. 15, 2015, 11 pages.
International Searching Authority, "International Preliminary Report on Patentability", issued in connection with PCT Patent Application No. PCT/US2013/066157, mailed on Sep. 15, 2015, 8 pages.
Wikipedia, "Slip (vehicle dynamics)," [https://en.wikipedia.org/wiki/Slip_%28vehicle_dynamics%29], retrieved on Oct. 1, 2015, 2 pages.
Youtube, "How a Differential Works and Types of Differentials," Mar. 28, 2011, [https://www.youtube.com/watch?feature=fvwp&NR=1&v=gIGvhvOhLHU], retrieved on Oct. 1, 2015, 1 page.
Youtube, "How Diff Lock Works and When to Use It (UK Terminology, Land Rover)," Dec. 19, 2010, [https://www.youtube.com/watch?v=RcRBYpccP6g], retrieved on Oct. 1, 2015, 1 page.
Reform, "The new MOUNTY 110 V," [http://www.reform.at/en/agriculture/mounty-slope-tool-carrier/action.view/entity.detail_product/key.13.html], retrieved on Oct. 1, 2015, 1 page.
Youtube, "Auto 4wd and Diff Lock," Jun. 19, 2011, [https://www.youtube.com/watch?v=egQ8fNP7IXI], retrieved on Oct. 1, 2015, 1 page.
Wikipedia, "Steering," [https://en.wikipedia.org/wiki/Steering], retrieved on Oct. 1, 2015, 7 pages.
Youtube, "Tractor rolling over on a hillside," Aug. 19, 2011, [https://www.youtube.com/watch?v=V8F-Y2w_3eo&feature=related], retrieved on Oct. 1, 2015, 1 page.
Youtube, "Almost deadly tractor roll over," Apr. 12, 2012, [https://www.youtube.com/watch?v=U1g-mUKGyYw], retrieved on Oct. 1, 2015, 1 page.
Youtube, "Crab Walk," Feb. 3, 2008, [https://www.youtube.com/watch?v=2CqZoE86IMc&feature=related], retrieved on Oct. 1, 2015, 1 page.
Youtube, "F40 Towing Tractor with 4 wheel steering," Oct. 26, 2008, [https://www.youtube.com/watch?v=x0MMi54eaBU&feature=related], retrieved on Oct. 1, 2015, 1 page.
Leng et al., "A Simple Tractor-Trailer Backing Control Law for Path Following with side-slope Compensation," May 9-13, 2011, Shanghai, China, 2011 IEEE International Conference on Robotics and Automation, pp. 2386-2391, 6 pages.

* cited by examiner

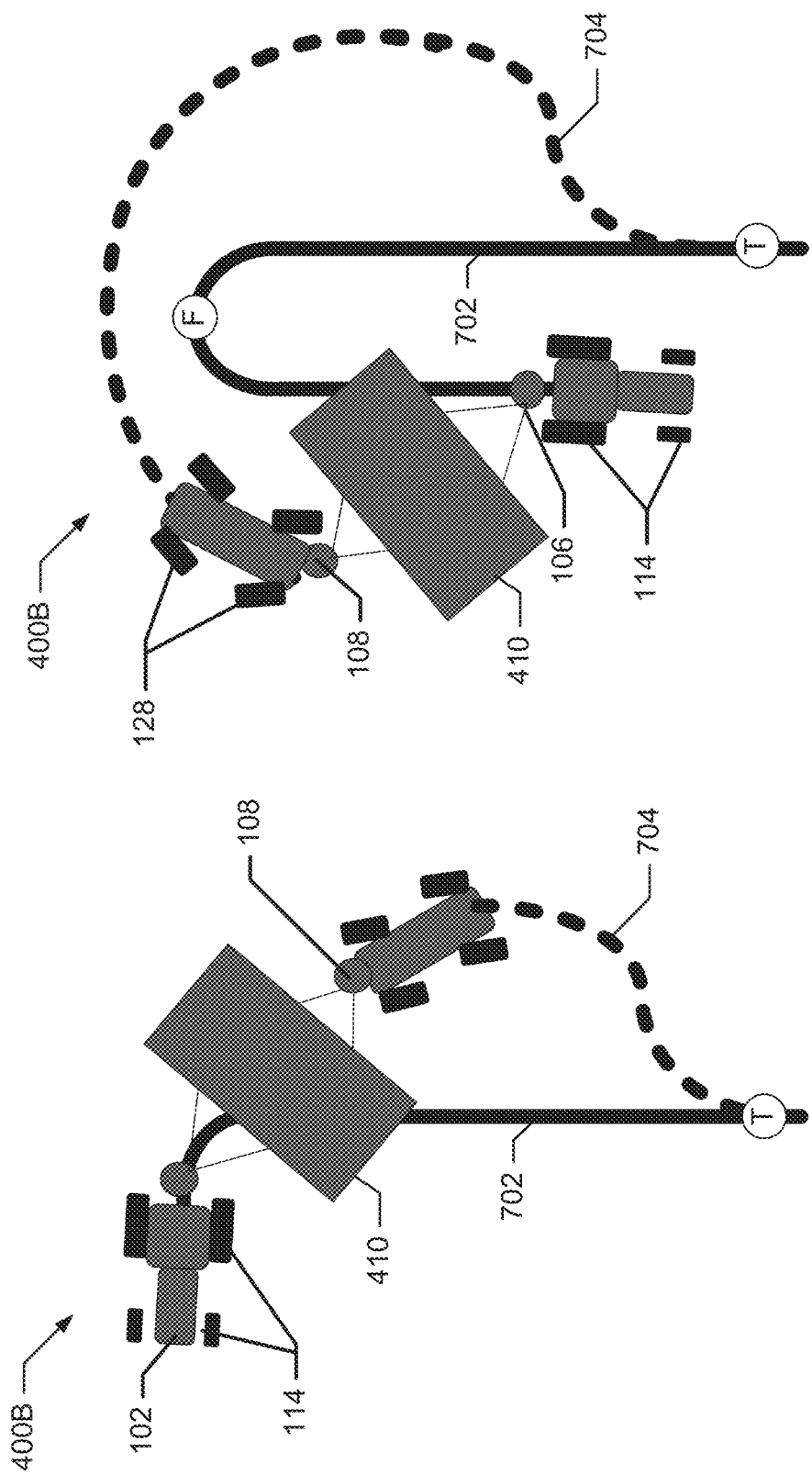

METHODS AND APPARATUS TO CONTROL MACHINE CONFIGURATIONS

FIELD OF THE INVENTION

This disclosure relates generally to work machines, and, more particularly, methods and apparatus to control work machine configurations.

BACKGROUND

Work machines for construction, agricultural, or domestic applications may be powered by an electric motor, an internal combustion engine, or a hybrid power plant including an electric motor and an internal combustion engine. For example, in agricultural uses an operator may control the machine to harvest crops and/or plant seed, or accomplish some other task in a work area. Machine configurations may include multiple machines coupled together to provide additional traction and/or power to complete a task. The machine configurations may include an implement (e.g., a field plow, a cultivator, a tiller, a planter, a seeder, etc.).

SUMMARY

An example method disclosed herein includes identifying a machine configuration, the machine configuration comprising a host machine connected to an auxiliary machine; determining a desired trajectory based on at least one of the host machine turning, a desired work path, or an alignment of the host machine and the auxiliary machine; and controlling steering of the auxiliary machine based on a desired trajectory of the host machine.

An example apparatus disclosed herein includes a configuration analyzer to a machine configuration, the machine configuration comprising a host machine connected to an auxiliary machine; a path identifier to determine a desired trajectory based on at least one of the host machine turning, a desired work path, or an alignment of the host machine and the auxiliary machine; and a controller to control steering of the auxiliary machine based on a desired trajectory of the host machine.

An example machine readable storage medium is disclosed herein having machine readable instructions which when executed cause a machine to identify a machine configuration, the machine configuration comprising a host machine connected to an auxiliary machine; determine a desired trajectory based on at least one of the host machine turning, a desired work path, or an alignment of the host machine and the auxiliary machine; and control steering of the auxiliary machine based on a desired trajectory of the host machine.

BRIEF DESCRIPTION OF THE DRAWINGS

FIGS. 7A-7B illustrate topographic views of an example implementation of the machine configuration of FIG. 4B executing a turning maneuver by implementing the machine controller of FIG. 2.

DETAILED DESCRIPTION

Methods and apparatus for controlling machine configurations are disclosed. The machine configurations may include one or more powered machine(s) (i.e., a machine powered by an electric motor, an internal combustion engine (ICE), a hybrid power plant including an electric motor and an ICE, a hydraulic motor and an ICE, etc.) and one or more non-powered or powered implements (e.g., a field plow, a cultivator, a tiller, a planter, a seeder, etc.). Example machine configurations disclosed herein are controlled to complete a task (e.g., plow a field, plant seed, remove snow, etc.) along a desired trajectory and/or work path. Methods and apparatus disclosed herein include controlling the power and/or turning ground engaging elements of one or more machine(s) of a machine configuration based on one or more factor(s) including: an arrangement of the machine configuration, a desired work path of the machine configuration, an alignment of the machine configuration, a location of the machine configuration, machine characteristic(s) of the machine(s) of the machine configuration, and/or work path characteristic(s) of the desired work path.

In some examples, when it is determined that the machine configuration is off-course (e.g., not within a threshold distance of a desired work path), the machine controller may automatically control one or more of the machine(s) of the machine configuration to return to the desired work path. In some examples, the machine controller calculates a correction path for the machine(s) and/or machine configuration to return to the desired work path.

In some examples, the machine controller may provide varying amounts of power to ground engaging elements of the machine(s) of the machine configuration or control the ground engaging elements using various power modes. In such examples, the varied control of the ground engaging elements may enable the control to steer the machine configuration.

Figure 1:
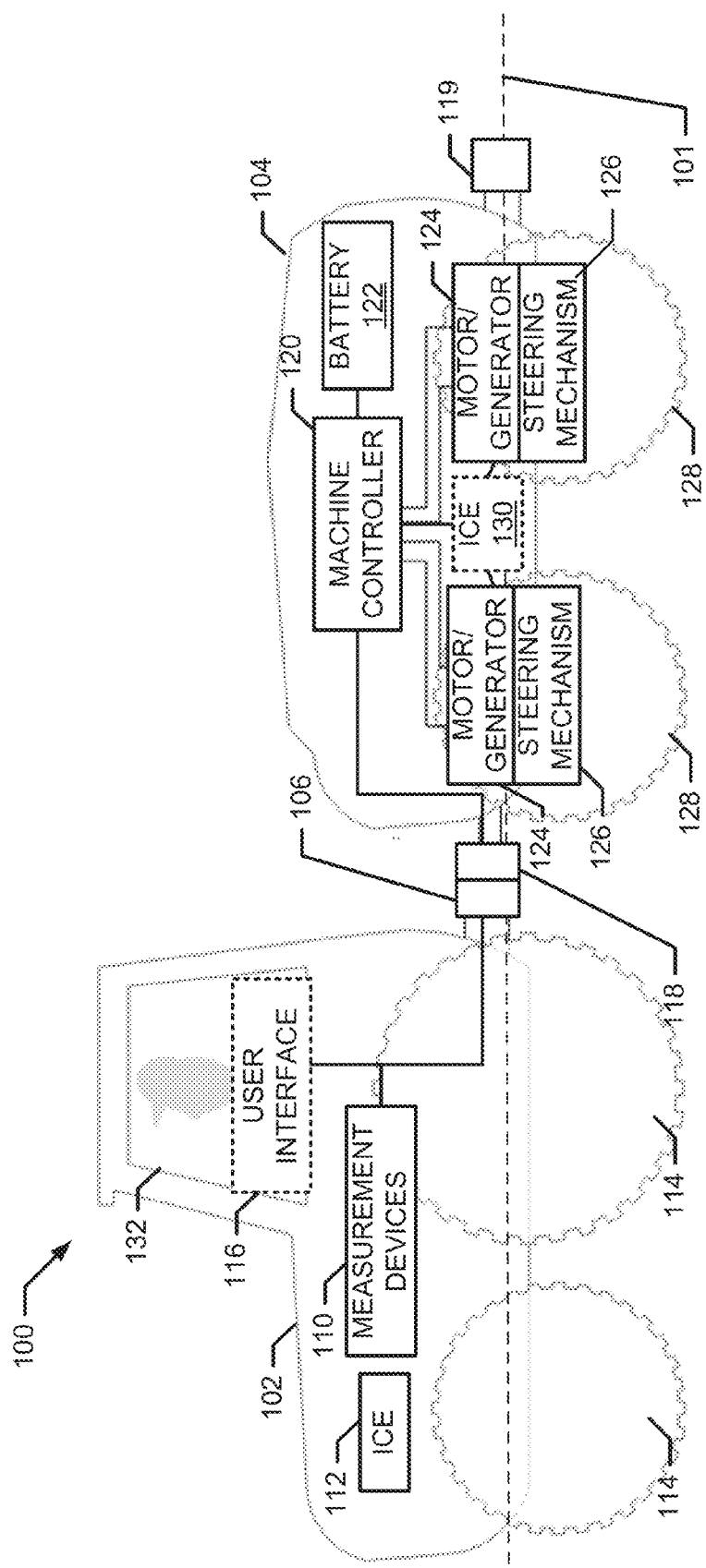
FIG. 1 is a diagram of an example machine configuration that may implement or utilize machine control methods and apparatus constructed in accordance with the teachings of this disclosure.

FIG. 1 is an illustrated example of a machine configuration 100 having a longitudinal axis 101 and including a host machine 102 and an auxiliary machine 104. The example host machine 102 includes, among other components, machine measurement devices 110, an internal combustion engine (ICE) 112, and wheel(s) 114. The example host machine 102 may also include an optional user interface 116. In some examples, the wheels 114 may be replaced by or used in addition to other ground engaging element(s) (e.g., one or more track(s)).

In the illustrated example, the host machine 102 is connected to the auxiliary machine 104 via a connector 106 (e.g., a drawbar hitch, a Power Take-off (PTO), hydraulic, electrical connections, communication connections, control signaling connections, power take-off (PTO), etc.). In some examples, an implement (e.g., a seeder, tillage machinery, etc.) may be connected to the host machine 102 via the connector 106. In some examples, the implement is connected between the host machine 102 and the auxiliary machine 104 via the connector 106 or other similar connection.

The host machine 102 may be a tractor or other similar machine used for agricultural equipment, construction equipment, turf care equipment, snow removal equipment, etc. The host machine 102 of FIG. 1 may be operator-controlled (a machine having an operator in optional cab 132), autonomous (without an operator and/or cab), semi-autonomous or any combination of the foregoing characteristics. An autonomous machine is self-guided without operator intervention or with minimal operator intervention. A semi-autonomous machine may provide guidance instructions to an operator or driver who executes the guidance instructions and may use independent judgment with respect to the instructions.

The machine measurement devices 110 of FIG. 1 provide characteristic information on the machine configuration 100 and/or the environment in which the machine configuration 100 is located. The machine measurement devices 110 may include one or more GPS receiver(s) to determine a location of the host machine 102 and/or auxiliary machine 104. An example GPS receiver included in the machine measurement devices 110 may include a receiver with a differential correction device or another location-determining receiver. The machine measurement devices 110 may include machine gauges (e.g., fuel gauges, temperature gauges, etc.) and/or sensor devices (e.g., draft sensors, load sensors, proximity sensors, inclinometers, braking sensors, cameras, etc.) to determine corresponding states and/or characteristics of the machine configuration 100, such as load, fuel, power levels, spatial configuration (i.e. one or more proximate distance(s) between machines and/or alignment of the machines of the machine configuration 100), etc. The example machine measurement devices 110 may include one or more sensor(s) to determine characteristics and/or work area/work path conditions such as soil conditions, topography, vegetation conditions/density, lead vehicle distance/location, etc. In some examples, the machine measurement devices 110 include data monitors/retrievers (e.g., a mobile device (e.g., a smartphone, a tablet computer, etc.), a computer, etc.) that retrieve data (e.g., soil maps, weather data, moisture data, topographical data, etc.) from a network (e.g., the Internet).

Though the example of FIG. 1 illustrates the machine measurement devices 110 on the host machine 102, the example machine measurement devices 110 may be partially or entirely located on the host machine 102, the auxiliary machine 104, and/or separate from the machine configuration 100. In some examples, the machine measurement devices 110 may be located on a server associated with the host machine 102 and/or the auxiliary machine 104.

The auxiliary machine 104 of the example machine configuration 100 may be an autonomous and/or semi-autonomous machine to provide additional traction and/or power to the host machine 102 while in operation, and, in some examples, generating additional power to conserve overall energy consumption of the machine configuration. In the example of FIG. 1, the auxiliary machine 104 includes connectors 118, 119, a machine controller 120, a battery 122, one or more motor generator(s) 124; one or more steering mechanism(s) 126 connected to the wheels 128. The auxiliary machine 104 of FIG. 1 may also include an ICE 130 that may be used to charge the battery 122, provide electric current to the motor(s) 124, and/or provide mechanical power to the wheels 128. In some examples, the auxiliary machine 104 does not include the ICE 130 and an alternative power source, such as a fuel cell, may be included to power the auxiliary machine 104. The example auxiliary machine 104 may connect the connector 106 of the host machine 102 via the connector 118. In some examples, the auxiliary machine 104 is connected to an implement via the connector 118 and/or the connector 119.

The example machine controller 120 of FIG. 1 may be used to control the auxiliary machine 104 (and/or the host machine 102 in some examples) to traverse a desired work path. Thus, in the example of FIG. 1, the auxiliary machine 104 is an autonomous or semi-autonomous machine. The desired work path may be generated or defined by a user via the user interface 116 (e.g., by providing geographic route data). Desired work paths, such as those generated using heuristics or historical data (e.g., a saved route recorded by a GPS receiver) may be stored by the machine controller 120. In some examples, a path planner (see U.S. patent application Ser. No. 13/839,391), which is hereby incorporated by reference) may be used to generate the desired path. The example machine controller 120 controls power to the wheels 128 from the ICE 130 and/or motor(s) 124 and controls steering any combination of the wheels 128 via the steering mechanisms 126. The example steering mechanisms 126 include any appropriate mechanical, electrical, hydraulic, or other similar mechanisms for turning the wheels 128 to steer the auxiliary machine 104.

Alternative or additional machine configurations to the machine configuration 100 of FIG. 1 are possible, including machine configurations with an implement (e.g., a field plow, a cultivator, a tiller, a planter, a seeder, etc.) or multiple auxiliary machines 104.

Figure 2:
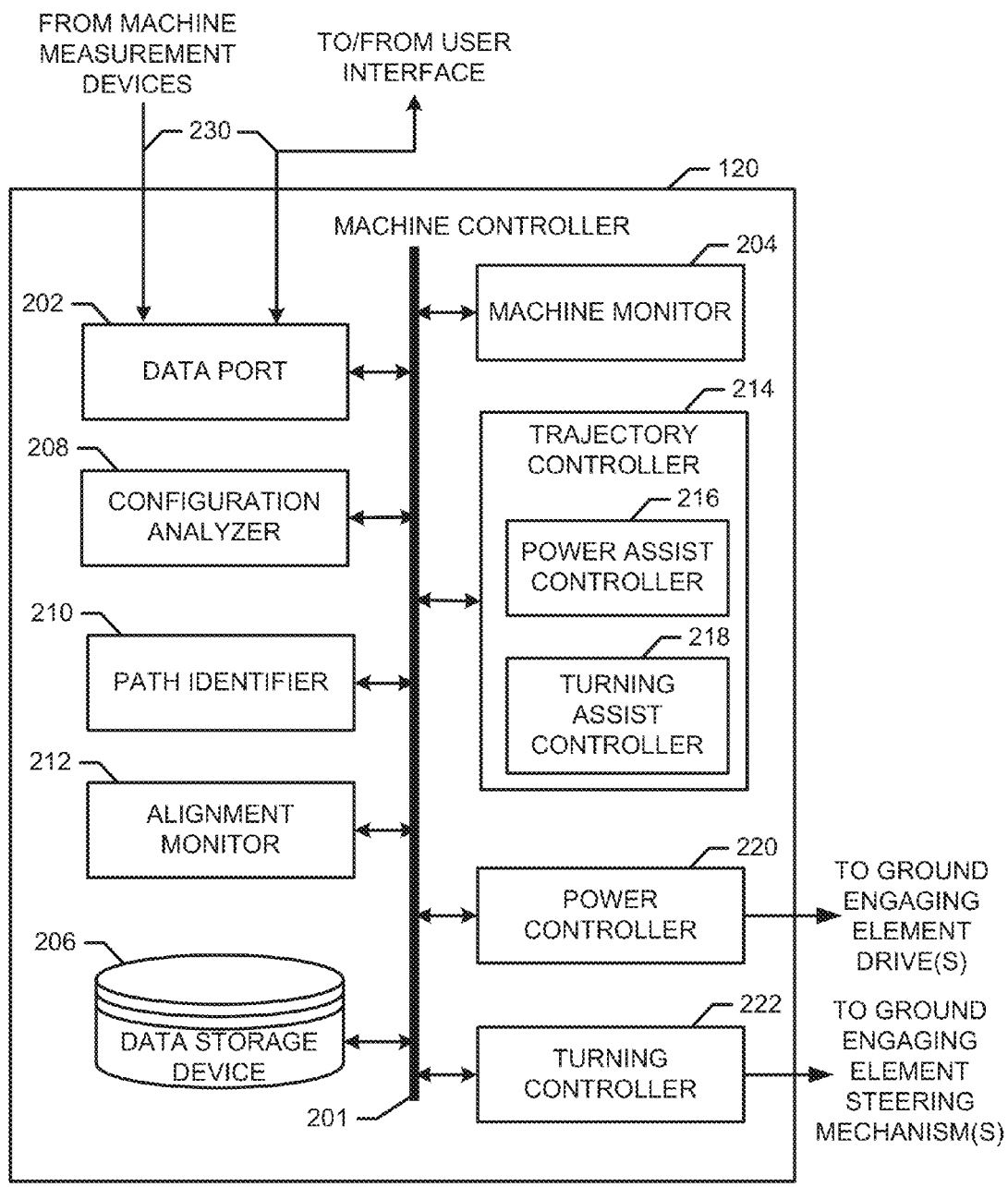
FIG. 2 is a block diagram of an example machine controller for controlling one or more machines of a machine configuration according to the present disclosure.

FIG. 2 illustrates a block diagram showing additional detail of one example implementation of the example machine controller 120 of FIG. 1. The descriptions of the machine controller 120 disclosed herein refer to controlling the auxiliary machine 104 of the machine configuration 100 of FIG. 1, though the machine controller 120 may be used to control other machines and/or machine configurations. The example machine controller 120 of FIG. 2 includes a communication bus 201 to facilitate communication between a data port 202, a machine monitor 204, a data storage device 206, a configuration analyzer 208, a path identifier 210, an alignment monitor 212, a trajectory controller 214 including a power assist controller 216 and turning assist controller 218, a power controller 220, and/or a turning controller 222. The data port 202 accepts input data from the machine measurement devices 110, and/or the user interface 114 via communication links 230. The communication links 230 may be wired and/or wireless communication links.

The machine monitor 204 determines machine characteristics of the machine configuration 100 received from the machine measurement devices 110. The characteristics of the machine configuration 100 may include, but are not limited to, energy levels of any energy storage devices (e.g., the battery 122, hydraulic fluid accumulators, flywheels, etc.), fuel levels, load levels, spatial measurements, braking statuses, etc. The machine monitor 204 may monitor geographic position measurements and/or geolocation data of the host machine 102 and/or the auxiliary machine 104 received from one or more GPS receiver(s) of the machine measurement devices 110. The example machine monitor 204 may monitor spatial measurements of the machine configuration 100 using data from draft sensor(s), proximity sensor(s), and/or inclinometer(s) of the machine measurement devices 110. The data storage device 206 may be located in the memory controller 120 and/or at a separate location (e.g., a cloud).

The configuration analyzer 208 in the example of FIG. 2 identifies and/or determines an arrangement of the machine configuration 100. The configuration analyzer 208 determines how the host machine 102 and auxiliary machine 104 are connected to each other (e.g., via the connectors 106, 118). Additionally, in some examples, the configuration analyzer 208 may determine how the machine configuration 100 or other machine configurations are connected to an implement. For example, the configuration analyzer 208 may determine that a machine configuration includes an implement connected in series (perhaps via a PTO and/or implement connection) between a host machine (e.g., the host machine 102) and an auxiliary machine (e.g., the auxiliary machine 104). The configuration analyzer 208 can determine a number of machines (e.g., a host machine 102, one or more auxiliary machine(s) 104, and/or one or more implements) in a machine configuration and how they are arranged.

In some examples, the configuration analyzer 208 identifies one or more offset(s) of an arrangement. An offset is a distance between a longitudinal axis of a machine (e.g., the auxiliary machine 104) and a longitudinal axis of a machine configuration. The configuration analyzer 208 determines the presence of an offset in an arrangement when a machine of the configuration is offset relative to a longitudinal axis of another machine in the configuration (see FIGS. 5A-5C). The example machine configuration 208 may identify an arrangement of the machine configuration 100 based on information received from the user via the user interface 116 and/or stored in the data storage device 206. In some examples, a user can input the type of machines (host machine, auxiliary machine, implement etc. and/or corresponding characteristics, models of the machines, etc.) and how they are coupled together using graphical user interface (GUI) of the user interface 116. In some examples, machine arrangement data corresponding to the potential configurations (e.g., a configuration 100) may be stored on the data storage device 206 and selected by the user via the user interface 116. In other examples, the machine arrangement may be identified from one or more identifiers (e.g., a radio frequency identifier (RFID), a bar code identifier, a quick response code (QC) identifier, etc.) on the machines 102, 104 using a sensor (of the machine measurement devices 110) such as an RFID tag reader, a bar code scanner, or a QC code reader, etc. The arrangement data may be retrieved (e.g., from the Internet) based on the information read from the identifiers.

The example path identifier 210 determines a desired trajectory and/or a desired work path that the machine configuration 100 is to traverse or is to follow. The example path identifier 210 detects the desired trajectory of the machine configuration based on sensors (e.g., steering sensors, proximity sensors, gauges, etc.) of the host machine 102 and/or the auxiliary machine 104. In some examples, the path identifier may identify that one or more of the wheels 114 of the host machine are turned at a certain angle. Accordingly, in such examples, the path identifier 110 may identify a desired path for the auxiliary machine 104 to follow in order to prevent the auxiliary machine 104 (and/or an implement connected to the host machine 102 and/or the auxiliary machine 104) from colliding (e.g., jackknifing) with the host machine 102, and/or from "cutting a corner" of a turn. As an example, if the host machine 102 is making a right-hand turn around an object, the auxiliary machine 104 be steered toward the left-hand side of the machine configuration (away from the object) based on the turning angle of the wheels 114 of the host machine 102 to avoid from being pulled into the object. Accordingly, in such examples, the auxiliary machine 104 may follow an alternate path from the host machine 102

In some examples, the desired work path is pre-computed (e.g., a predetermined work path for the machine configuration is known). In such examples, the example path identifier 210 may identify the desired work path using input from a user via the user interface 116 and/or data stored in the data storage device 206, which may be selected by the user via the user interface 116, and/or may be identified based on a default setting of the machine controller 120. For example, if the machine controller 120 determines that the machine configuration 100 is located at a particular location (e.g., via a GPS receiver of the measurement device 110) and/or is performing a particular task (e.g., plowing a field, harvesting crops, etc.), a work path used at the particular location for the particular task may be identified. The example path identifier 210 may also identify conditions of the desired work path based on information received from the machine monitor 204, machine measurement devices 110, and/or the user interface 116. For example, the path identifier 210 may identify soil conditions, inclines/declines in topography, etc. at particular points of the desired work path.

The example alignment monitor 212 monitors a location of machines (e.g., the host machine 102 and/or the auxiliary machine 104) of the machine configuration 100. In some examples, the alignment monitor 212 tracks the location of the machines 102, 104 relative to the work path identified by the path identifier 210. The example alignment monitor 212 uses information received from the one or more measurement device(s) 110, such as one or more GPS receiver(s) (e.g., multiple GPS receivers or antennae may be located on a machine to identify a course heading (e.g., 0° north, etc.)), to determine whether the host machine 102 and/or auxiliary machine 104 is on-course, i.e., the host machine 102 and/or the auxiliary machine 104 are within a threshold distance (e.g., 2 yards, 1 meter, 1 foot, 6 inches, etc.) of the desired work path identified by the path identifier 210. By comparing geographic location data (e.g., geographic coordinates such as latitude and longitude) and a trajectory of the machines 102, 104 of the machine configuration 100 to the geographic coordinates of the identified path, the alignment monitor 212 can determine whether the host machine 102 and/or auxiliary machine 104 are off-course and/or susceptible to going off-course. The alignment monitor 212 may determine how far or potentially how far the machine configuration 100 may be off-course or may be heading off-course.

In some examples of FIG. 2 the alignment monitor 212 determines whether the host machine 102 and/or the auxiliary machine 104 of the machine configuration 100 are on-course using one or more draft sensors and/or proximity sensors of the machine measurement devices 110. The draft sensors and/or proximity sensors may be located on the host machine 102 and/or the auxiliary machine 104 of the machine configuration 100. Draft sensors are well-known devices in the art, and may be used to detect a force at one or more points of a machine or implement (such as the host machine 102 or the auxiliary machine 104). Proximity sensors are well-known devices in the art and may be used to determine a distance (e.g., 1 foot, 1 meter, etc.) between two objects (e.g., a corner of the host machine 102 and a proximate corner of the auxiliary machine 104). In these examples, the alignment monitor 212 may determine an alignment of the machine configuration 100 using the arrangement data from the configuration analyzer 208 and/or data from the draft sensors and/or proximity sensors. The alignment monitor 212 of the example then compares the alignment of the machine configuration 100 to a contour of the desired work path to identify if the machine configuration is aligned with the desired work path.

If the example alignment monitor 212 of FIG. 2 determines that the machine configuration 100 is aligned as expected to follow a trajectory and/or traverse the work path at a particular location, then the alignment monitor 212 determines that the machine configuration 100 is on-course. On the other hand, if the alignment monitor 212 determines that the machine configuration 100 is not aligned as expected (e.g., a pivot angle about the connection between connectors 106, 118 exists when no pivot angle should exist) to traverse the desired work path at the corresponding location, the alignment monitor provides alignment data (e.g., data representative of a speed, a trajectory data, and/or a location of the machine configuration 100) to the trajectory controller 214.

The example trajectory controller 214 of FIG. 2 includes a power assist controller 216 and a turning assist controller 218 to determine a power and steering controls for the auxiliary machine 104.

In some examples, the trajectory controller 214 receives machine characteristics (e.g., turning angles of wheels from steering sensors, load information from weight sensors, etc.) from the machine monitor 204, the machine measurement devices 110, and/or work path conditions from the path identifier 210. Based on the machine characteristics (e.g., operating rate, direction of travel, direction of steering, location from work path, etc.) and/or desired work path conditions (e.g., soil conditions, topography, etc.), the trajectory controller 214 via the power assist controller 216 may identify the required amount of power to be applied to the one or more wheel(s) 128 of the auxiliary machine 104 via the power controller 220 and/or may identify, via the turning assist controller 218, any required turning adjustments to be made to the one or more wheel(s) 128 via the turning controller 222.

In the example of FIG. 2, the trajectory controller 214 receives alignment data from the alignment monitor 212 corresponding to whether the machine configuration 100 is on-course (e.g., aligned with the host machine 102 according to a desired trajectory, located at an expected location of the desired work path), off-course (e.g., located at an unexpected location of the desired work path), or heading off-course (e.g., based on a traveling rate and trajectory of the machine configuration 100 and, in some examples, upcoming contours of the work path) from the alignment monitor 212. Based on the alignment data, the power assist controller 216 determines a power mode (as described below) for the auxiliary machine based on information (e.g. geographic location data, inclinometer, speedometer, proximity sensors, draft sensors, etc.) received from the machine measurement devices 110, and instructs the power controller 220 to control power to the wheels according to the power mode. In the examples of FIG. 2, the power assist controller 216 selects a power mode for the auxiliary machine 104 from at least one of a neutral mode, a min-slip mode, a braking mode (and/or regenerative braking mode), or a trajectory assist mode, as described below.

In neutral mode, the wheels 128 are "free-wheeling" (i.e., neither providing power nor braking). The power assist controller 216 may select neutral mode for controlling the auxiliary machine 104 when the machine configuration 100 is on-course and on relatively flat terrain, in low resistance soil conditions (e.g., dry), low resistance vegetation (e.g., low density), etc. The neutral mode may be implemented to conserve energy (e.g., stored in the battery 122) and/or fuel of the machine configuration 100 when added power is not need from the auxiliary machine 104.

The power assist controller 216 may select a min-slip mode for controlling power to the wheels 128 when the machine configuration 100 is moving forward on-course and all of the wheels 128 are engaged and managed for maximum traction and minimum slip. In examples disclosed herein, slip refers to a condition where a wheel may be spinning but is not gaining traction with the ground. In min slip mode, the auxiliary machine 104 provides added traction power and load power to the host machine 102. In some examples, a minimum amount of slip may be non-zero to allow for handling of sudden torque spikes on the wheels 128.

The power assist controller 216 may implement a braking mode when the machine monitor 204 and/or machine measurement devices 110 (e.g., brake sensors) indicate that the machine configuration 100 is to brake (e.g., on declining contours of the desired work path, heading off-course, etc.) and/or stop. In such examples, the power assist controller 216 may disengage power to the wheels 128 and/or apply brakes as necessary. In some examples, where the auxiliary machine 104 or other machines of the machine configuration 100 include a hybrid electric system (e.g., the battery 122 and/or the motor(s) 124), the braking mode may include a regenerative braking mode. In the regenerative braking mode, motor(s) 124 may enter a braking mode, effectively slowing the machine configuration 100, while generating electric current to charge the battery 122. The power assist controller 216 may select the regenerative braking mode of the motor(s) 124 in addition to or as an alternative to a traditional braking mode (i.e., disengaging power to the wheels and/or applying brakes, such as disk brakes, drum brakes, etc.).

The power assist controller 216 may select a trajectory assist mode when the alignment monitor 212 indicates that the machine configuration 100 is off-course and/or heading off-course. The trajectory assist mode enables the machine configuration 100 to remain on-course and/or get back on a desired trajectory and/or work path if it is off-course. In trajectory assist mode, the power assist controller 216 may calculate a necessary amount of power and/or traction that needs to be provided individually, simultaneously, or cooperatively to the wheels 128 by the power controller 220 to enable the auxiliary machine 104 (and/or the host machine 102) to get back on-course and/or remain on-course. Such example calculations maybe based on the alignment data received from the alignment monitor 212 and information from the machine monitor 204 and/or measurement devices 110.

Accordingly, in the trajectory assist mode, the power assist controller 216 may instruct the power controller 220 to provide different amounts of power to each of the wheels 128 and/or the same amount of power to all of the wheels 128 depending on what is necessary to get the machine configuration 100 back on-course or to keep the machine configuration 100 on-course. In some examples the trajectory assist mode involves the power controller 220 applying any combination of free-wheeling mode, min-slip mode, or braking (and/or regenerative braking) mode to the wheels 128. For example, one wheel will be controlled using a regenerative braking mode and another wheel will be controlled using a min-slip mode, etc. In such examples, the varied power modes may enable the power controller 220 to steer the auxiliary machine 104 using the alternate power modes or amounts of power applied to the wheels 128.

The example turning assist controller 218 of the trajectory controller 214 determines a direction to which the one or more wheels 128 are to be turned by the turning controller 222. When on-course, the turning assist controller 218 identifies machine characteristics (e.g., a turning angle of one or more wheels 114 of the host machine 102) from the machine monitor 204, machine measurement devices 110, and/or alignment monitor 212 to determine the angle of turning for the wheels 128 either individually (i.e., each wheel may be turned to different degrees) or cooperatively (i.e. all in the same direction). In some examples, to move the auxiliary machine 104 back on-course (if the auxiliary machine 104 is off-course) and/or prevent the auxiliary machine 104 from going off-course (if the auxiliary machine 104 is heading off-course), the steering assist controller 218 calculates an angle to turn each of the wheels to return the auxiliary machine 104 and/or machine configuration back on course.

The example power controller 220 of FIG. 2 controls the power (e.g., mechanically from the ICE 130 or mechanical brakes and/or electrically via the motor(s) 124 and battery 122) to be provided to the wheels 128 of the auxiliary machine 104 according to power data received from the power assist controller 216. In some examples, the power controller 220 may control power to the wheels 114 of the host machine 102 and/or any other machine (e.g., another auxiliary machine, an implement, etc.) of the machine configuration 100.

The example turning controller 222 controls the steering mechanisms 126 of the wheels 128 according to turning data received from the turning assist controller. In some examples, the turning controller 222 receives steering data from the trajectory controller 214 to set the wheels 128 in a direction to keep the machine configuration 100 on-course and/or prevent the machine configuration 100 from going off-course.

While an example manner of implementing the machine controller 120 of FIG. 1 is illustrated in FIG. 2, one or more of the elements, processes and/or devices illustrated in FIG. 2 may be combined, divided, re-arranged, omitted, eliminated and/or implemented in any other way. Further, the data port 202, the machine monitor 204, the data storage device 206, the configuration analyzer 208, the path identifier 210, the alignment monitor 212, the trajectory controller 214, the power assist controller 216, the turning assist controller 218, the power controller 220, the turning controller 222, and/or, more generally, the example machine controller 120 of FIG. 2 may be implemented by hardware, software, firmware and/or any combination of hardware, software and/or firmware. Thus, for example, any of the data port 202, the machine monitor 204, the data storage device 206, the configuration analyzer 208, the path identifier 210, the alignment monitor 212, the trajectory controller 214, the power assist controller 216, the turning assist controller 218, the power controller 220, the turning controller 222, and/or, more generally, the example machine controller 120 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the data port 202, the machine monitor 204, the data storage device 206, the configuration analyzer 208, the path identifier 210, the alignment monitor 212, the trajectory controller 214, the power assist controller 216, the turning assist controller 218, the power controller 220, the turning controller 222, is/are hereby expressly defined to include a tangible computer readable storage device or storage disk such as a memory, a digital versatile disk (DVD), a compact disk (CD), a Blu-ray disk, etc. storing the software and/or firmware. Further still, the example machine controller 120 may include one or more elements, processes and/or devices in addition to, or instead of, those illustrated in FIG. 2, and/or may include more than one of any or all of the illustrated elements, processes and devices.

Figure 3A:
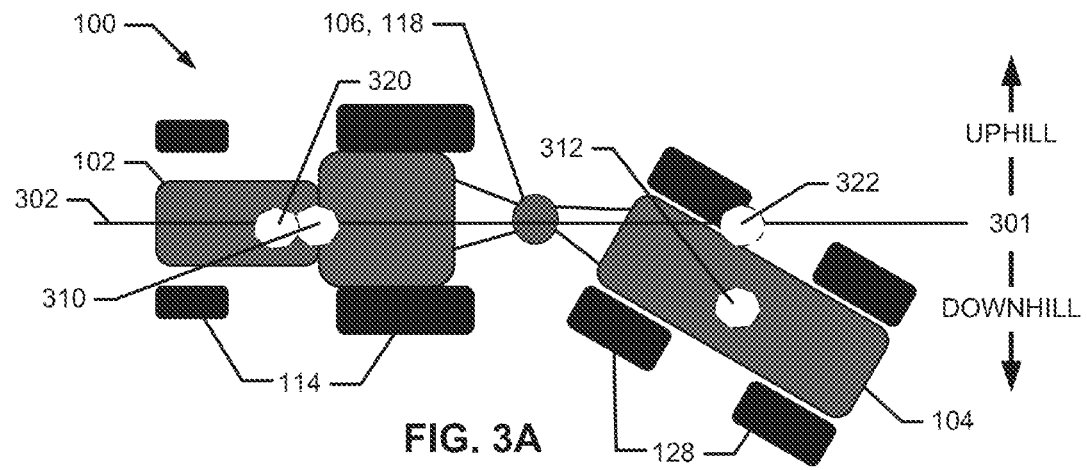
FIGS. 3A-3C illustrate topographic views of an example implementation of the machine configuration of FIG. 1 implementing the machine controller of FIG. 2 to traverse a side slope.
Figure 3B:
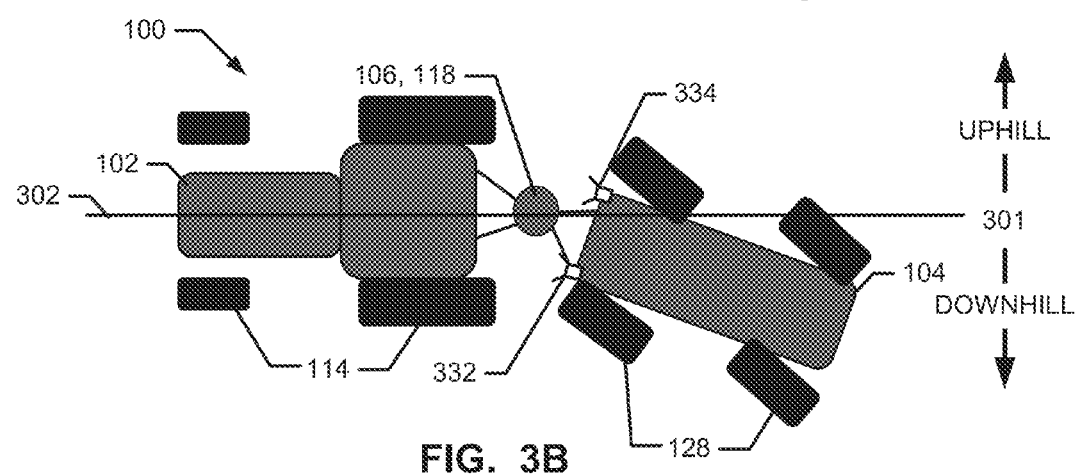
Figure 3C:
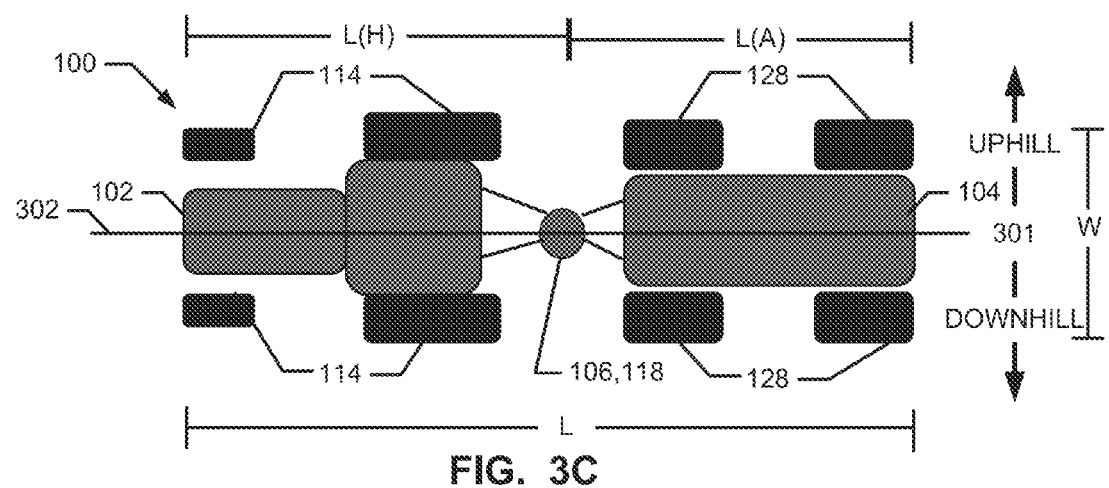

FIGS. 3A-3C illustrate topographic views of an example implementation of the machine configuration 100 of FIG. 1 utilizing the machine controller 120 of FIG. 2 traversing a side slope. The side slope of FIGS. 3A-3C is situated relative to a desired work path 302 and identified by the "uphill" and "downhill" arrows 301. FIG. 3A illustrates that the auxiliary machine 104 may slide downhill (e.g., due to gravity) as it is pulled along the side slope of the desired work path 302. Accordingly, in FIG. 3A, an actual host machine location 310, an actual auxiliary machine location 312, an expected machine location 320, and an expected auxiliary machine 322 may be determined by the machine controller 120 (e.g., using GPS, machine measurement devices 110, etc.). In this example, the machine controller 120 controls the auxiliary machine 104 to align the actual locations 310, 312 with the expected locations 320, 322, as described below.

In FIG. 3B, a path correction process is initiated by the trajectory controller 214 of the machine controller 120 to correctly align the auxiliary machine 104 along the work path 302. In FIG. 3B, the machine controller 120 may direct the wheels 128 to steer the auxiliary machine 104 uphill and toward the desired work path 302. In some examples, the machine controller 120 may provide additional power to one or more of the wheels 128 and/or disengage or perform regenerative braking on one or more of the wheels 128 according to the power assist controller 216. Additionally, FIG. 3B illustrates sensors 332, 334 (e.g., draft sensors, proximity sensors, cameras, etc.) on the auxiliary machine 104 to provide information to the machine controller 120 to return the auxiliary machine to the path 302, as described below.

FIG. 3C illustrates the machine configuration 100 properly aligned along the desired work path 302 despite being located on a side slope. In FIG. 3C, the power assist controller 216 and/or power controller 220 may be providing additional power to one or more of the wheels 128 and/or performing regenerative braking on one or more of the wheels 128 relative to other wheels 128 of the auxiliary machine 104 in order steer the auxiliary machine 104 along the desired work path 302. In some examples, the machine turning controller 222 may turn one or more of the wheels 128 uphill (as similarly shown in FIG. 3B) to maintain the alignment of the machine configuration 100. FIG. 3C additionally indicates dimensions (L(H), L(A), L, W) to indicate the size of the machines 102, 104 in the machine configuration 100.

Figure 4A:
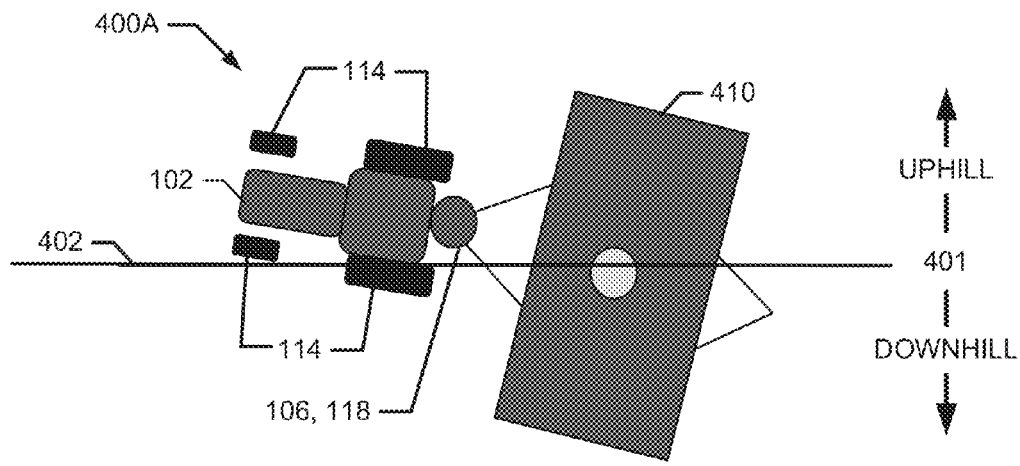
FIG. 4A illustrates a topographic view of an example machine configuration traversing a side slope without having a machine including the machine controller of FIG. 2.
Figure 4B:
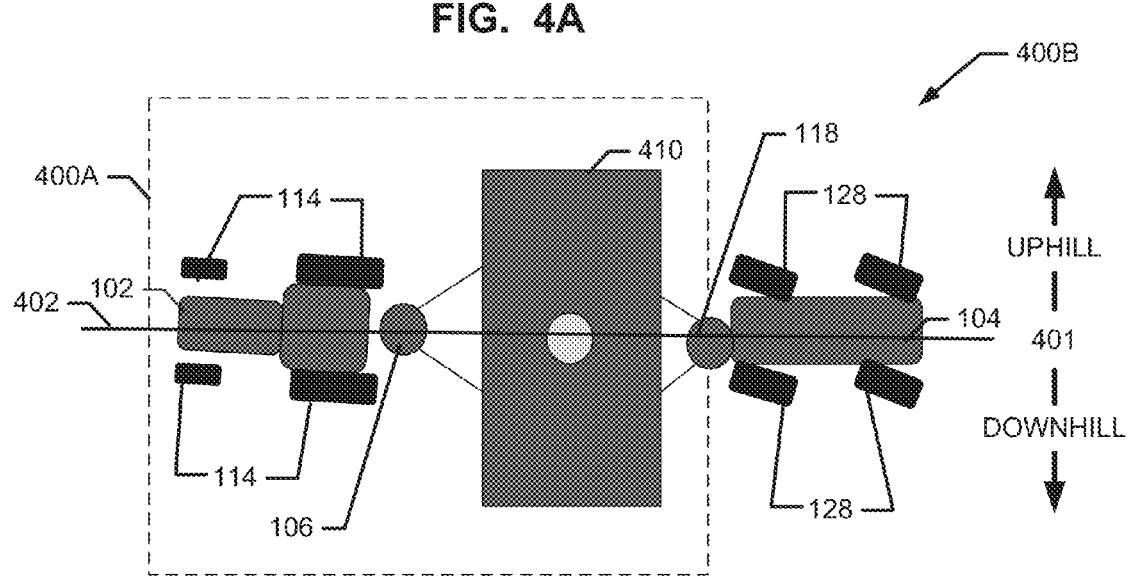
FIG. 4B illustrates the example machine configuration of FIG. 4A traversing the side slope with a machine including the machine controller of FIG. 2.

FIGS. 4A-4B illustrates the difference an auxiliary machine 104 including the machine controller 120 may make for a machine configuration 400A to traverse a side slope. The side slope of FIGS. 4A-4B is situated relative to a desired work path 402 and identified by the "uphill" and "downhill" arrows 401.

In FIG. 4A, the machine configuration 400A traverses a side slope (as similarly shown in FIGS. 3A-3C) without having a machine (e.g., the auxiliary machine 104 of FIGS. 1 and/or 4B) including the machine controller 120 of FIG. 2. FIG. 4A illustrates that an implement 410 of the machine configuration 400A may slide downhill of a desired work path 402 (e.g., due to gravity) as it is pulled by a host machine 102. Accordingly, the host machine 102 may be unable to keep the implement 410 (which may not be powered) properly aligned along the desired work path 402.

FIG. 4B illustrates machine configuration 400B including the example machine configuration 400A of FIG. 4A with an auxiliary machine 104 including the machine controller of FIG. 2. The auxiliary machine 104 may be automatically controlled by the machine controller 120 to keep the machine configuration 400B on-course, i.e. aligned with the desired work path 402.

Figure 5A:
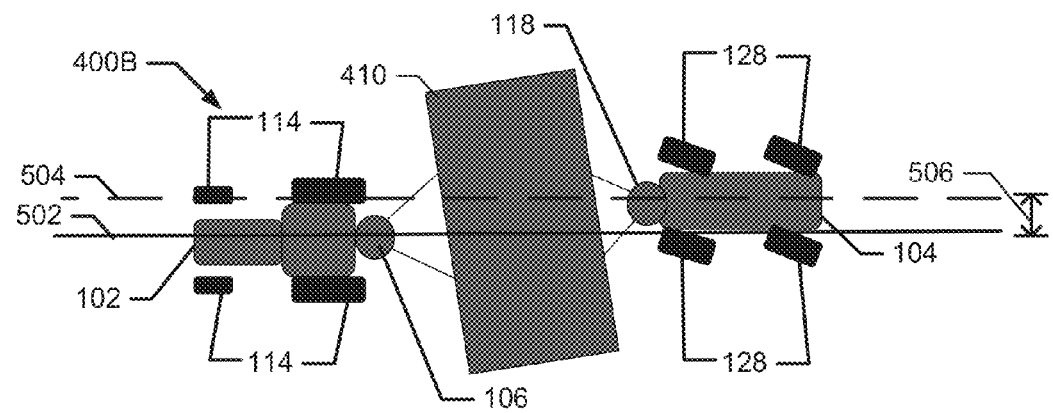
FIGS. 5A-5C illustrate topographic views of example implementations of machine configurations with offsets using the machine controller of FIG. 2.
Figure 5B:
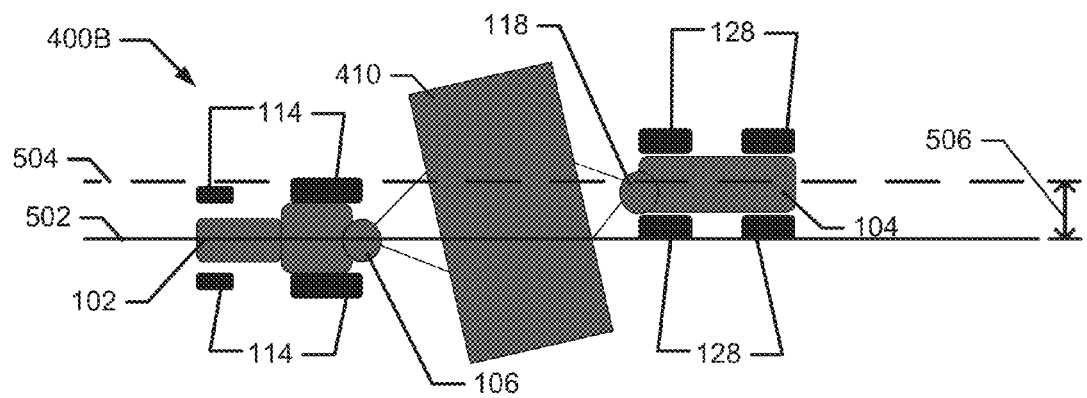
Figure 5C:
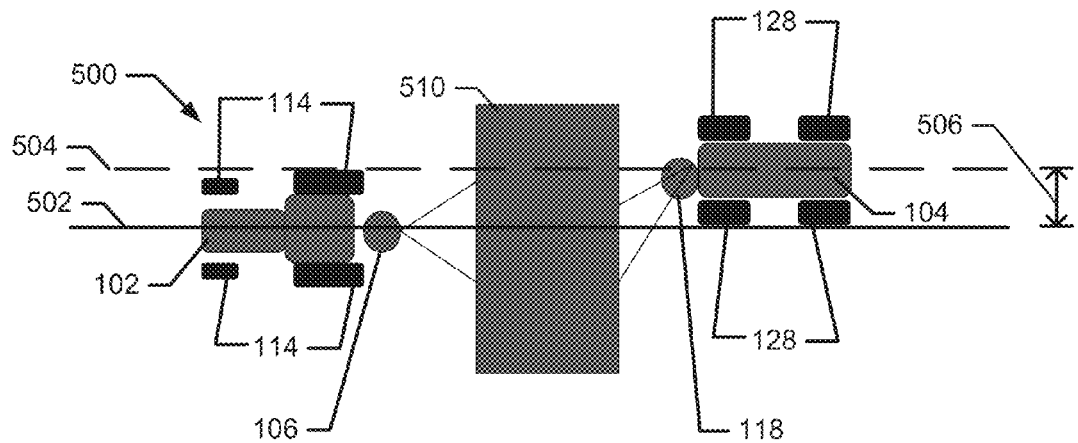

FIGS. 5A-5C illustrate topographic views of example implementations of machine configurations 400B and 500 in offset configurations using the machine controller of FIG. 2. The offset machine configurations 400B, 500 of FIGS. 5A-5C may be used to reduce path compaction. By implementing the offset 506 between a desired path of the host machine 502 and a desired path of the auxiliary machine 504, both sets of the wheels 128 of the auxiliary machine 104 will generally not follow the same path as the wheels 114 of the host machine 102, thus reducing soil compaction along the desired work path 502. In some examples, user may request the machine controller 120 to control the auxiliary machine 104 in an offset position. Based on selected settings (e.g., an offset distance 506 and/or direction), an offset method (e.g., controlling turning and/or variable power to one or more of the wheels 128, etc.), etc.), the machine controller 120 controls the auxiliary machine 104 to perform tasks offset (e.g., by an offset distance 506) from the host machine 102.

In the examples of FIGS. 5A-5B, the machine configuration 400B of FIG. 4B includes the host machine 102 and the auxiliary machine 104 in an offset configuration traversing work paths 502, 504. In FIG. 5A, the offset 506 of the machine configuration 400B is established by turning the wheels 128 using the turning controller 222 (i.e., to turn the wheels 128 toward the desired auxiliary machine path 504 relative to the desired host machine path 502) to maintain the offset 506 of the machine configuration 400B. In FIG. 5B, the offset of the machine configuration 400B is established by controlling the power to the wheels 128 using the power assist controller 116 and/or power controller 220 (i.e., to vary power applied to the one or more wheels 128) to maintain the offset 506 of the machine configuration 400B. In some examples, the machine controller 120 implements both the steering and power control methods of FIGS. 5A and 5B to maintain the offset 506 between the desired paths 502, 504.

In FIGS. 5A-5B, the implement 410 of the machine configuration 400B may operate in an off-axis configuration (i.e., the implement 410 may not be aligned with a longitudinal axis (e.g., an axis parallel to the work paths 502, 504) of the machine configuration 400B). In the example of FIG. 5C, to overcome an off-axis configuration of the implement 410, a machine configuration 500 may include a mechanical offset on the implement 510. For example, the implement connector 118 of the auxiliary machine 104 may connect to an offset hitch 512 (e.g., a ball hitch, a three point hitch, a PTO) of the implement 510 that is offset by an offset distance 506 from a center of the implement 510 and/or from a longitudinal axis of the machine configuration 500. Thus, in the example of FIG. 5, implement 510 may be used on axis along the desired work path 502. The configuration analyzer 208 may identify the offset machine configuration 500 based on a user input via the user interface 116.

Figure 6A:
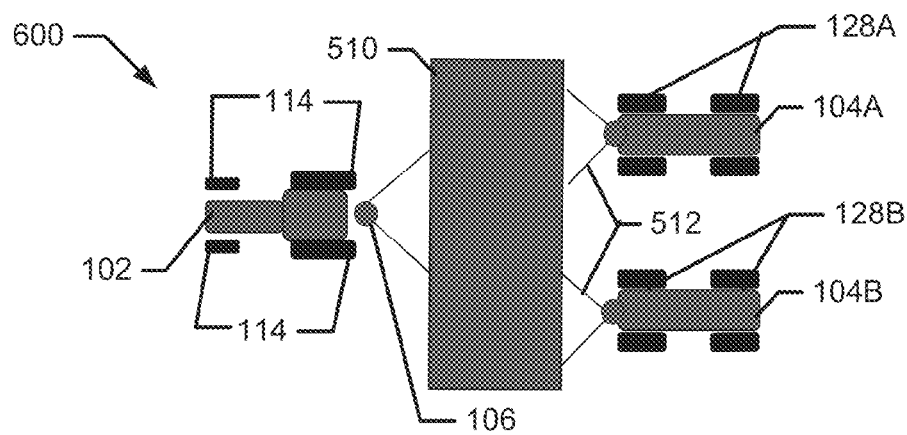
FIGS. 6A-6D illustrate topographic views of an example implementation of a machine configuration with parallel auxiliary machines implementing one or more of the machine controller(s) of FIG. 2.
Figure 6B:
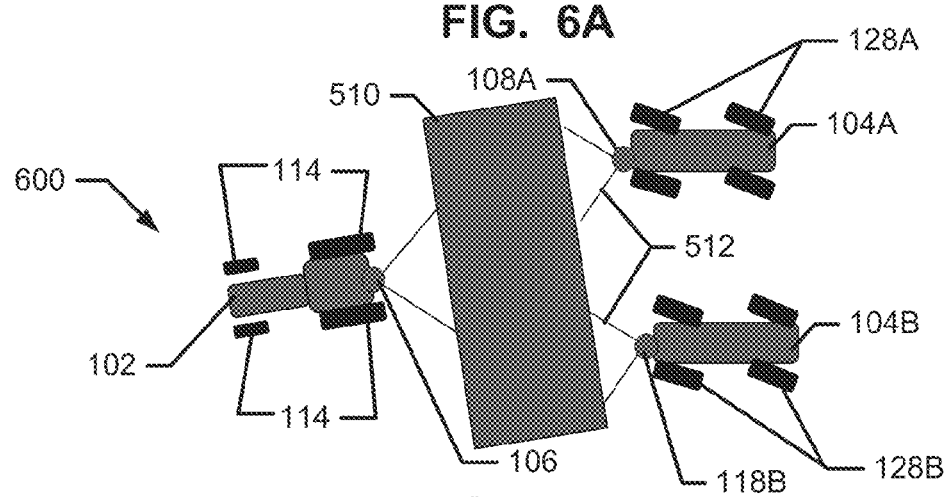
Figure 6C:
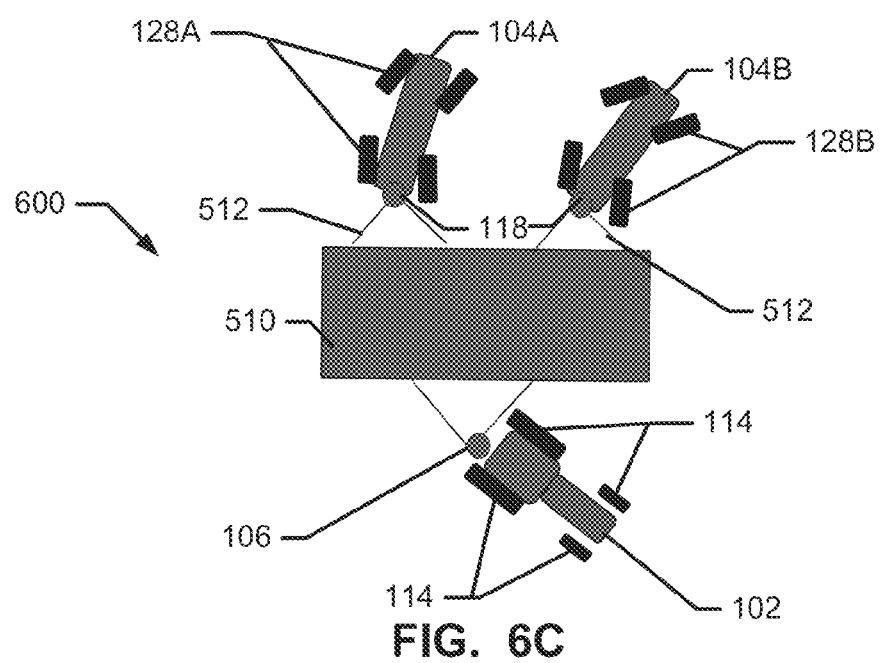

FIGS. 6A-6D illustrate topographic views of an example implementation of machine configuration 600, 600D with parallel auxiliary machines 104A, 104B using one or more the machine controller(s) 120 of FIG. 2. The example machine configuration 600, 600D include a host machine 102, the auxiliary machines 104A, 104B, and an implement 510 including offset hitches 512 (similar to the implement 510 and offset hitch 512 of FIG. 5C). The offset hitches 512 of FIGS. 6A-6D allow for the two auxiliary machines 104A, 104B to be connected in parallel to the implement 510, as shown (i.e., the auxiliary machines 104A, 104B are both connected to a tail side of the implement 510). Though two auxiliary machines 104A, 104B are illustrated in FIGS. 6A-6D, more than two auxiliary machines 104 may be connected in parallel in a similar manner as shown in FIGS. 6A-6D. Additionally, the auxiliary machines 104 may located on either side of the implement 510. In the examples of FIGS. 6A-6C with the auxiliary machines on the same side as the host machine 102 and in the example of FIG. 6D with the auxiliary machines 104 on the opposite side of the host machine 102.

FIGS. 6A-6C illustrate a series of positions of the machine configuration 600 executing a turning maneuver. In FIG. 6A, the machine configuration 600 is traveling in a straight line (as can be seen by the straight alignment of wheels 114, 128A, 128B). In FIG. 6B, the machine configuration 600 begins to make a turn. The host machine 102 may initiate the turn itself by turning one or more of the wheels 114, and the auxiliary machines 104A, 104B turn their wheels in an opposite direction of the turning maneuver, which may prevent a collision between the host machine 102, the implement 510 and/or one or more of the auxiliary machine 104A, 104B (e.g., jackknifing the machine configuration 600). In FIG. 6C, a second position of the machine configuration 600 further executing the turn shows the wheels 128A, 128B now steering the auxiliary machines 104A, 104B in a direction to follow direction of the turning maneuver. As shown, the direction of the wheels 128B may be turned to a different degree (e.g., a sharper angle) than the direction of the wheels 128A to account for the auxiliary machine 104B turning a smaller radius while executing the turning maneuver than the auxiliary machine 104A.

Figure 6D:
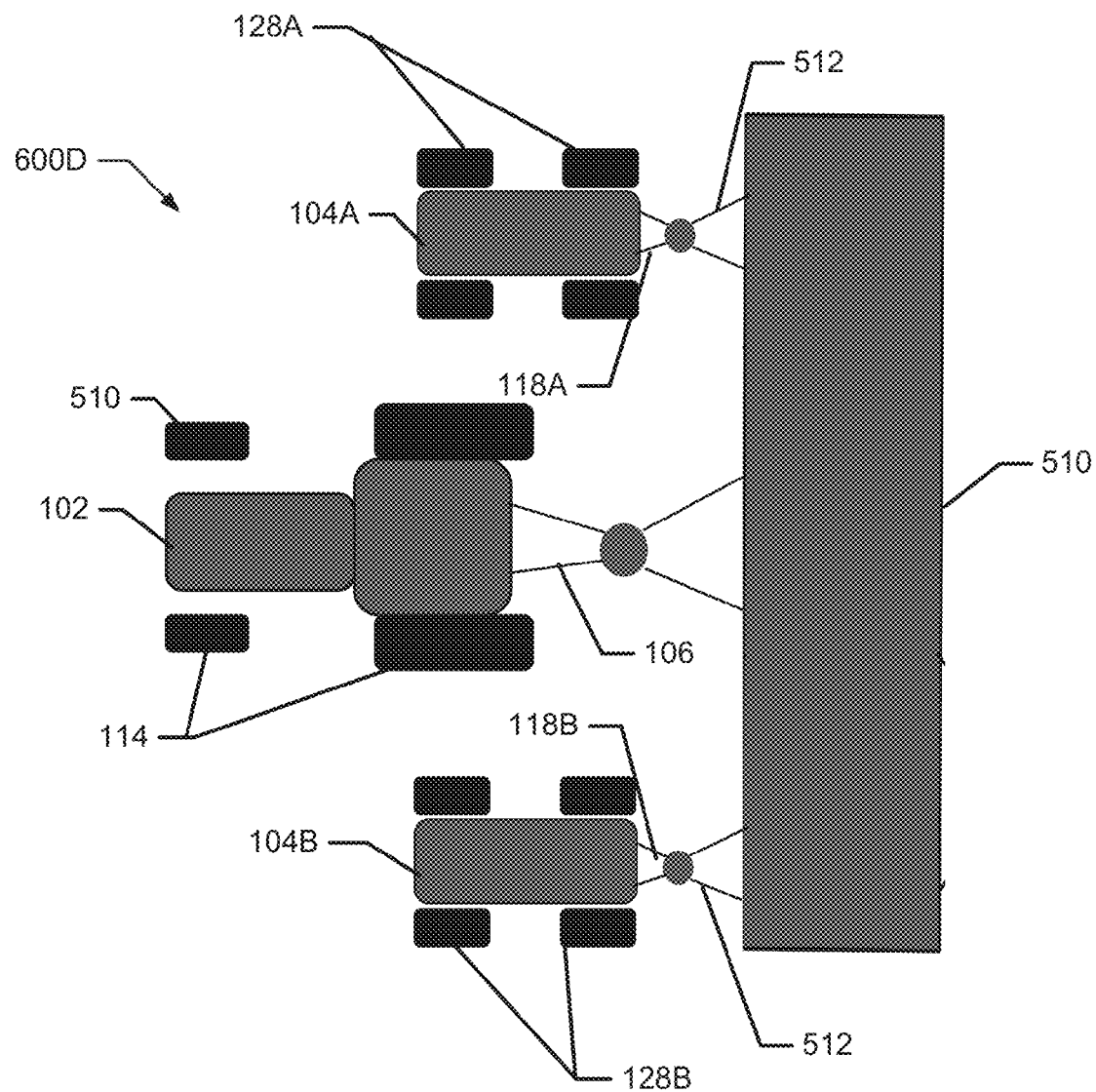

In a similar fashion in FIG. 6D, the auxiliary machines 104A, 104B when connected on the same side of the implement 510 as the host machine 102 may be used to pull the implement in parallel with the host machine 102. Accordingly, when making turns or maneuvering, the one or more machine controller(s) 120 of the auxiliary machines 104A, 104B may account for their respective locations in the machine configuration 600D. For examples, if the host machine 102 beings to turn toward the auxiliary machine 104A, the auxiliary machine 104A may enter a regenerative braking mode to slow that side of the machine configuration 600D, while the second auxiliary machine 104B increases power to account for the greater distance that the second auxiliary machine 104B must traverse to make the turn toward the auxiliary machine 104A. In some examples, the one or more machine controller(s) 120 may use the machine measurement devices 110 of each of the machines 102, 104A, 104B of the configuration 600D are equally or substantially equally using the same amount of power to pull the implement 510. Such examples may increase the efficiency of the machine configuration 600D by preventing at least one of the machines from expending unnecessary energy to pull the implement (because it may be working against the other machines).

The auxiliary machines 104A, 104B of the example machine configuration 600 and similar example machine configurations having multiple machines may be controlled by a single machine controller 120 or multiple machine controllers 120. In examples where a single machine controller 120 is used, the machine controller 120 may be located on any one of the machines (e.g., the host machine 102, the auxiliary machines 104A, 104B, the implement 510) of the machine configuration 600. In examples where a plurality of machine controllers 120 are used in the machines of the machine configuration 600, the machine controllers 120 may communicate with each other providing status information (e.g., a turning degree of the wheels 128, amount of power applied to the wheels 128, sensor information (e.g., an amount of force experienced), whether the wheels are slipping, etc.) and may act in a similar manner as the machine measurement devices 110 of FIG. 1 relative to each other (e.g., a first machine controller 120 would use status signals or data from a second machine controller 120 in a similar manner as the first machine controller uses data from the machine measurement devices 110 of FIG. 1)

FIGS. 7A-7B illustrate topographic views of an example implementation of the machine configuration 400B of FIG. 4B executing a turning maneuver by implementing the machine controller 120 of FIG. 2. In FIGS. 7A-7B, the example machine configuration 400B executes a light bulb turn that enables an operator of the host machine 110 to make a U-turn as shown in host machine path 702, while the machine controller 120 automatically controls the auxiliary machine 104 to follow the auxiliary machine path 704. In agricultural examples, prior techniques of executing such a turn without an auxiliary machine 104 and/or a machine controller 120 for the auxiliary controller 104 (e.g. using the machine configuration 400A of FIG. 4A), may require the operator of the host machine 102 to manually perform a light bulb turn (rather than a U-turn) of the machine configuration 400A. The light bulb turn illustrated in FIGS. 7A-7B enables an operator maneuver the machine configuration 400B to align the implement 410 parallel to a previous segment (e.g., a straight line segment of the work path 702 before the U-turn) of the work path 702. In some examples, the operator may indicate via the user interface 114 that a light bulb turn is to be executed, and the machine controller 120 executes the light bulb turn in response to the instructions form the user and/or sensor information of the machine devices 110 (e.g., steering sensor data, proximity sensor data, draft sensor data, geolocation data from a GPS receiver, etc.).

In the illustrated example of FIG. 7A, a first position of the machine configuration 400B performing a light bulb turn is shown. As shown, the host machine 102 begins a U-turn indicated by the host machine path 702 and the auxiliary machine 104 begins turning away from the direction of the light bulb turn on the host machine path 704. In FIG. 7B, the light bulb turn is nearly complete as the host machine 102 has completed the U-turn on the path 702 and the auxiliary machine 104 has circled around the U-turn of the path 702 on the auxiliary machine path 704 and begins to follow the implement 410 and steer toward aligning with the host machine path 702. In some examples, the host machine 102 may make a small light bulb turn and the auxiliary machine 104 may make a larger light bulb turn. The example turning maneuver of FIGS. 7A-7B may be executed using any one of the example configurations 100 (e.g., with an implement in series behind the auxiliary machine 104), 400B, 500, 600 disclosed herein or other similar configurations (e.g., configurations having more than two auxiliary machines 104).

Figure 8:
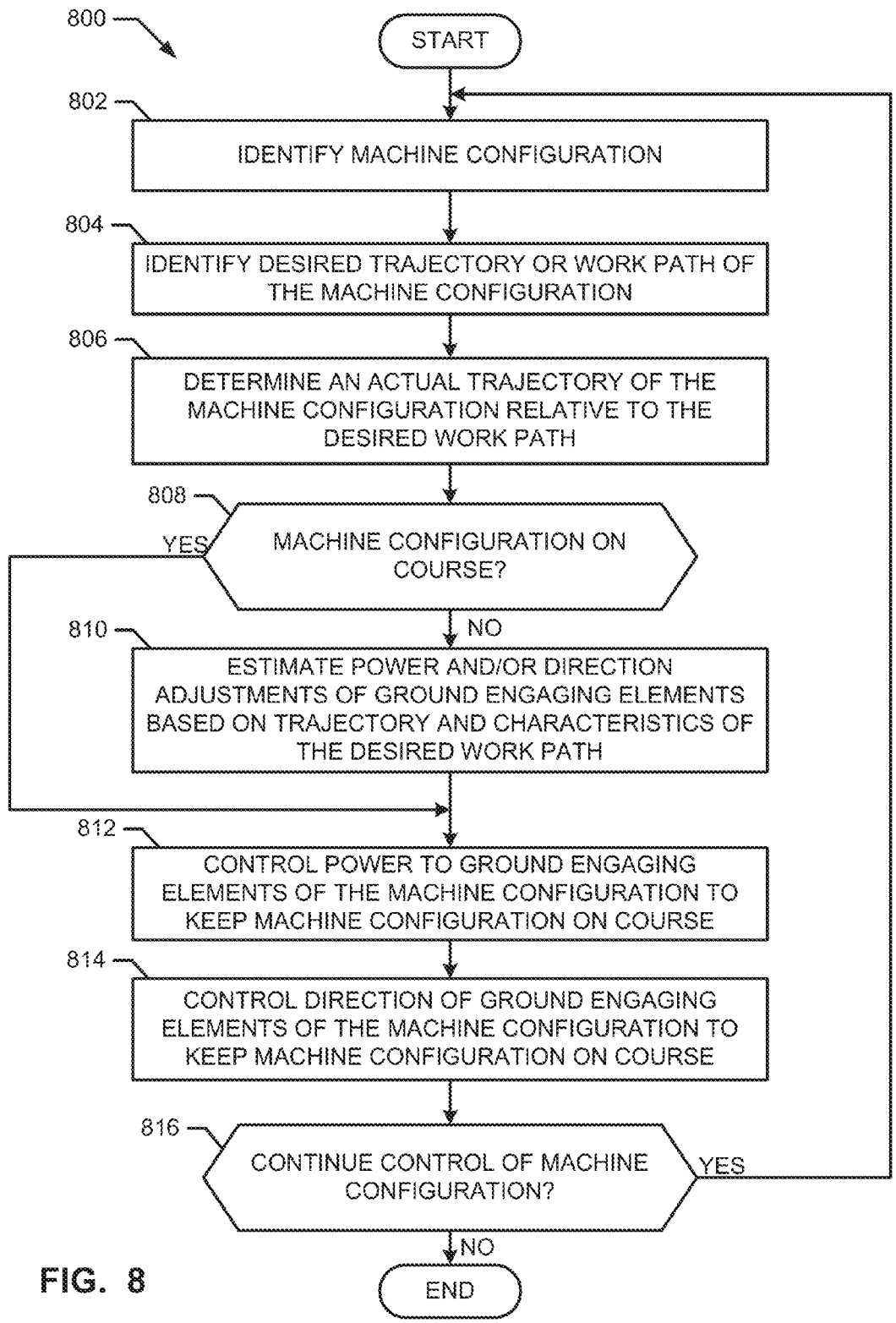
FIG. 8 is a flowchart of an example method, which may be implemented using machine readable instructions, for controlling a machine of a machine configuration.

A flowchart representative of a process that may be implemented using example machine readable instructions for implementing the machine controller 120 of FIG. 2 is shown in FIG. 8. In this example, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example machine controller 120 may alternatively be used. For example, the order of execution of the blocks may be changed, and/or some of the blocks described may be changed, eliminated, or combined.

As mentioned above, the example process of FIG. 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

An example process 800 that may be executed to implement the machine controller 120 machine of FIG. 2 is represented by the flowchart shown in FIG. 8. With reference to the preceding figures and their associated descriptions, the process 800 of FIG. 8, upon execution (e.g., initiating the machine controller 120), causes the machine controller 120 to begin control of the example auxiliary machine 104 (and/or the auxiliary machine 104A, 104B) in an example machine configuration (described herein with reference to FIG. 8 to refer to one or more of the machine configurations 100, 400B, 500, 600 or other machine configurations). The example process 800 is iterative. Accordingly, multiple instances of the process 800 (e.g., multiple threads of machine readable instructions) may exist and/or execute in parallel simultaneously or substantially simultaneously to control other machines (e.g., the host machine 102 and/or an implement) of the example machine configuration.

At block 802 of FIG. 8, the configuration analyzer 208 of FIG. 2 identifies an arrangement of the example machine configuration. In the example of FIG. 8, the configuration analyzer 208 identifies types of the machines (e.g., a host machine, an implement, an auxiliary machine) and/or corresponding specifications of the machines (e.g., horsepower, dimensions, features (e.g., included sensors) etc.) in the example machine configuration and how they are physically coupled to each other. For example, the configuration analyzer 208 determines that the machine configuration 100 of FIGS. 1 and/or 3A-3C includes the host machine 102 and the auxiliary machine 104 connected in series via the connectors 106, 118 (perhaps via an RFID tag, bar code scanner, QC code, etc.). Specification of the machines 102, 104 may be retrieved from the data storage device 206 or received from a user via the user interface. In some examples, the host machine 102 and/or auxiliary machine 104 may detect each other upon connecting the connectors 106, 118. For example, the host machine 102 may automatically provide (e.g., plug and play) machine characteristics or information via the connectors 106, 118.

As another example, the configuration analyzer 208 determines that the machine configuration 400B of FIGS. 4B, 5A-5B, and/or 7A-7B includes the host machine 102, the auxiliary machine 104, and an implement 410 connected in series to the auxiliary machine 104 via the connectors 106, 118 and the auxiliary machine 104 via the implement connector 118. In some examples, the implement 510 may be connected in series to the machine configuration 100 via the implement connector 118 of the auxiliary machine 104. In yet another example, the configuration analyzer 208 may identify offset arrangements, such as the offsets in the machine configuration 500 of FIG. 5C. In some examples, the configuration analyzer 208 can identify an arrangement including a parallel machine configuration 600 of FIG. 6A-6C.

The configuration analyzer 208 identifies an arrangement of a machine configuration to enable the machine controller 120 to determine and utilize the physical capabilities (e.g., turning maneuvers, load capacity, etc.) of the machine configuration to traverse a desired work path. In some examples, the configuration analyzer 208 receives an input from a user via the user interface 116 indicating the machine configuration. In some examples, data corresponding to the physics of a particular machine configuration may be stored in the data storage device 206 and retrieved by the configuration analyzer 208 at block 802.

The configuration analyzer 208 may identify machine dimensions of the machines of the machine configuration. In some examples, the configuration analyzer 208 determines the configuration based on dimensions of the machines of a machine configuration and calculated location(s) of pivot point(s) of the machine configuration. For example, in FIG. 3C, the configuration analyzer 208 may determine that the machine configuration 100 has a length L and a width W, the host machine 102 has a length L(H) and a width W, and the auxiliary machine has a length L(A) and a width W. Based on the above dimensions, the configuration analyzer 208 can calculate the location (e.g. L(H) from the front of the machine configuration 100 and W/2 from either side of the machine configuration 100) of the pivot point of the connectors 106, 118 relative to the machine configuration 100.

After block 802 of FIG. 8, the example path identifier of FIG. 2 identifies a desired work path that the example machine configuration is to follow (e.g., to perform a task such as plow a field, plant seeds, remove snow/snowplow, etc.). For example, the example path identifier 210 may identify the desired paths 302, 402, 502, 702 described above. In some examples, the path identifier 210 identifies an offset path (e.g., the path 504 of FIGS. 5A-5C) of a machine (e.g., the auxiliary machine 104) that is offset from another machine (e.g., the host machine 102) of the example machine configuration.

At block 804, the desired work path may be identified from at least one of a path planner, an input from a user via the user interface 116 and/or data corresponding to a desired work path stored in the data storage device 206. The path identifier 210 identifies the desired work path to determine whether the auxiliary machine 104 properly aligned in the machine configuration along the desired work path. In some examples, the user may indicate and/or input a desired work path of a particular maneuver (e.g., a turning maneuver such a light bulb turn or ninety degree turn, etc.) that is to be executed by the example machine configuration.

The example path identifier 210 may also identify characteristics of the desired work path including at least soil conditions, vegetation conditions, vegetation density, topographical contours (e.g., inclines, declines, side slopes, etc.) or any other type of identifiable data related to the desired work path. The path identifier 210 may retrieve data corresponding to the characteristics from one or more of the data storage device 206, the user interface 116, and/or the machine measurement device 110.

At block 806, the alignment monitor 212 determines a trajectory of the machines of the example machine configuration relative to the identified desired work path. For example, the alignment monitor 212 may determine that one or more machines of the example machine configuration is on-course (i.e., within a threshold distance (e.g., 1 foot, 1 meter, etc.) of the desired work path), off-course (i.e., outside a threshold distance from the desired work path), and/or is heading off-course (i.e., moving in a direction at a traveling/operating rate that would cause the machine configuration to go off-course). In some examples, the alignment monitor 212 compares geographic location data (e.g., data representative of geographic coordinates) of the desired work path with present and/or historical geographic location data of the example machine configuration (e.g., data received from a GPS receiver of the machine measurement devices 110). By tracking the geographic location data of the example machine configuration, the alignment monitor 212 may determine a trajectory and/or traveling/operating rate of the example machine configuration (e.g., performing a vector analysis of a current location and a past location, and using a rate formula such as traveling rate=distance/time).

At block 808 of FIG. 8, the alignment monitor 212 may use data from the configuration analyzer 208 to calculate whether the example machine configuration is on track or off track. For example, the configuration analyzer 208 may identify a default arrangement of the example machine configuration, and the alignment monitor 212 may determine an expected arrangement of the example machine configuration based on the location of a machine configuration along a work path. Referring to FIG. 5C as an example, the alignment monitor 212 identifies that the auxiliary machine 104 is off-course of the desired work path 502 by the offset 506. In this example, the alignment monitor 212 may refer to data for the offset path 504 received from the path identifier 210 and the arrangement data received from the configuration analyzer 208 to determine that the machine configuration 500 is actually on-course (despite the auxiliary machine 104 being off-course of the work path 502).

In the examples of FIGS. 3A-3C, the alignment monitor 212 of the machine controller 120 may detect that the auxiliary machine 104 and/or the host machine 102 are not aligned on the desired work path 302. Referring to FIG. 3A as an example, one or more GPS receivers (of the machine measurement devices 110) identify an actual host machine location 310 and/or an actual auxiliary machine location 312. The alignment monitor 212 may then compare the actual host machine location 310 to an expected host location 320 and/or the actual auxiliary machine location 312 to an expected auxiliary machine location 322. From such comparisons, the alignment monitor 212 determines whether the machines 102, 104 of the example machine configuration 100 are on-course or off-course. In the illustrated example, the alignment monitor 212 determines that the host machine 102 is on-course (i.e., the actual location 310 is within a threshold distance (e.g., 1 foot, 1 meter, etc.) of the expected location 320) but the auxiliary machine 104 is off-course (i.e., the actual location 312 is not within a threshold distance (e.g., 1 foot, 1 meter, etc.) of the expected location 322).

Referring now to FIG. 3B as an example, one or more sensors 332, 334 (of the machine measurement devices 110) are located on the auxiliary machine 104 (though they may additionally or alternatively be located on the host machine 102 or other machine). If the sensors 332, 334 of the illustrated example are draft sensors, the sensors 332, 334 detect an amount of force on the auxiliary machine 104 at the respective location of the sensors 332. If the sensors 332, 334 of the illustrated example are proximity sensors, the sensors 332, 334 detect a distance from the host machine 102 to the respective sensors 332, 334. In the illustrated example, the sensor 332 on the downhill side of the machine configuration 100 detects a shorter distance than the sensor 334 on the uphill side of the machine configuration 100. Using the distance information from the sensors 332, 334, the alignment monitor 212 can determine an actual alignment of the machine configuration 100 and compare the alignment to an expected alignment of the machine configuration 100 (e.g., the alignment of the machine configuration of FIG. 3C) at the corresponding location along the work path 302 using data from the configuration analyzer 208 and path identifier 210. Identifying that the work path 302 is a straight line but the machine configuration 100 is not in a straight alignment (which may be determined by the sensors detecting relatively equal distances to the host machine 102), the alignment monitor 212 detects that the machine configuration 100 is off-course.

If the alignment monitor 212 determines that the example machine configuration is on-course, control advances to block 812. However, if the alignment monitor 212 determines that the example machine configuration is off-course and/or heading off-course, the alignment monitor 212 notifies the trajectory controller 214 and control advances to block 810. At block 810, the trajectory controller 214 performs a path correction procedure to return the example machine configuration to a desired work path identified by the path identifier 210 and/or prevent the machine configuration from veering off the desired work path.

At block 810, the power assist controller 216 determines a power setting (e.g., engaged/disengaged, braking, regenerative braking, amount of power, etc.) and the turning assist controller 218 determines a direction to turn the wheels 128 of the one or more auxiliary machine(s) 104 of the example machine configuration based on data corresponding to at least one of an arrangement of the example machine configuration, actual locations of machines of the example machine configuration, a trajectory and/or speed of the example machine configuration, an alignment of the example machine configuration, an expected location of the machine configuration on an identified work path, and/or characteristics of the work path (e.g., soil conditions, topography, etc.), or other data that may affect control of the example machine configuration. In examples where it is determined that the example machine configuration is off-course, the power assist controller 216 may determine a correction path for one or more machines of the example machine configuration to follow in order to return to the desired work path. In examples where it is determined that the machine configuration is heading off-course, the power assist controller 216 may instruct the power controller 220 to adjust the power mode of the one or more ground engaging elements of the machine configuration (e.g., set one wheel to regenerative braking, and another wheel to min-slip mode).

Referring to the example of FIGS. 3A-3C, the power assist controller 216 of FIG. 2 (in used in FIG. 3A) and the turning assist controller 218 of FIG. 2 (used in FIG. 3B) may be individually or cooperatively implemented by the machine controller 120 to determine power adjustment(s) and/or direction adjustment(s) of the wheel(s) 128 (and/or the wheels 114) to return the machine configuration 100 to the appropriate alignment on the work path 302 (as shown in FIG. 3C). Referring to the example of FIG. 4B, the power assist controller 216 and/or the turning assist controller 218 may be individually or cooperatively implemented by the machine controller 120 to determine power adjustment(s) and/or turning adjustment(s) of the wheel(s) 128 (and/or the wheels 114) to keep the machine configuration 400B properly aligned along the desired work path 402.

Figure 9:
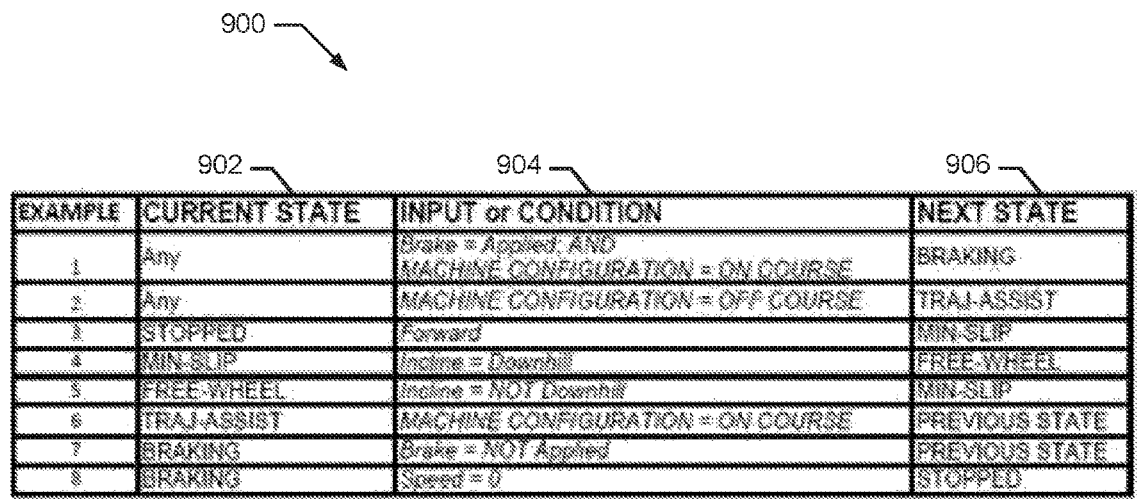
FIG. 9 is a state table illustrating example power mode selections for the machine configuration of FIG. 1.

In FIG. 8, at block 812, the power controller 220 selects a power mode (e.g., a free-wheel, a min-slip mode, a trajectory assist mode, a braking/regenerative braking mode, etc.) for controlling the wheels 128 of the one or more auxiliary machine(s) 104 of the example machine configuration. In some examples (e.g., when the example machine configuration is off-course and/or heading off-course), the power controller 220 controls the power to the ground engaging elements based on data received from the power assist controller 216 (e.g., in trajectory assist mode). In other examples (e.g., when the example machine configuration is on-course), the power controller 220 controls the power to the ground engaging elements based on information from at least one of the configuration analyzer 208, the path identifier 210, the machine measurement devices 110, and/or the user interface 116. An example state table is illustrated in FIG. 9 indicating example power mode selections that the power controller 220 may make based on a current state of the example machine configuration and one or more inputs or conditions identified by the above.

At block 814 of FIG. 8, the turning controller 222 controls the direction of the wheels 128 of the example machine configuration to steer one or more of the auxiliary machine(s) 104. In a trajectory assist mode, the turning controller 222 may control the direction of the wheels 128 based on instructions from the turning assist controller 218. In other examples, the turning controller 222 controls the direction of the wheels 128 based on geographic location data from the machine devices 110, arrangement data from the configuration analyzer 208, path data from the path identifier 210 and/or alignment monitor 212 to follow an identified path. In some examples, the turning controller 222 controls the direction of the wheels based on an input from the user interface 116 to execute a turning maneuver (e.g. a crab-steering maneuver, a light bulb turn, a zero-radius turn, etc.). For example, the turning controller 222 may turn the wheels 128 (and an operator may turn one or more of the wheels 114) to perform a crab steering maneuver that enables the machine configuration 100 to be steered diagonally relative to its longitudinal axis. In another example, a zero-radius turn maneuver may be executed by the turning controller 222, wherein the turning controller 222 turns the wheels 128 to enable the auxiliary machine 104 to spin in place while the implement 410 and/or host machine 102 of the machine configuration 400B rotate about the center of the auxiliary machine 104.

Referring now to the example of FIGS. 7A-7B, the machine controller 120 may identifier an input via the user interface 116 at location (T) to perform a light bulb turn. Upon receipt of such instructions, the turning controller 222 control the direction of the wheels 128 of the auxiliary controller. In some examples, 222, the turning controller 22 may identify a series of instructions indicating which directions to turn the one or more wheels 128 for a length of time and/or at locations to execute the light bulb turn (or any other turning maneuver) stored in the data storage device 206. For example, a first instruction may indicate that at location (T) turn the wheels at a particular degree away (shown in FIG. 7A) from the direction of the light bulb turn. In this example, a second instruction may indicate that at location (F) (shown in FIG. 7B) turn the one or more wheels 128 in a direction to begin following the direction of the light bulb turn.

At block 816 of FIG. 8, the power controller 220 and/or the turning controller 222 determine whether the machine controller 120 is to continue to control the example machine configuration and/or the auxiliary machine 104. If the machine controller 120 is to continue to control the machine configuration (e.g., a task is incomplete), control returns to block 802. If the machine controller 120 is to stop controlling the machine configuration (e.g., based on instructions from a user, the machine configuration is stopped, a system failure, a system shutdown, a power failure, etc.), then the process 800 ends.

Referring now to FIG. 9, a state table 900 includes example power mode selections (in rows 1-8) based on one or more inputs or conditions and a current state of the auxiliary machine of FIG. 1. The state table 900 includes a current state column 902, an input or condition column 904, a next state column 906, and example power mode selections rows 1-8. Other example power mode selections may exist in addition to those disclosed in rows 1-8. The current state column 902 indicates a current state (e.g., a power mode, speed, etc.) of the example machine configuration. The input or condition column 904 identifies data and/or conditions received from and/or identified by at least one of the machine measurement devices 110, the user interface 116, the alignment monitor 212, and/or the trajectory controller 214. The next state column 906 indicates the power mode that the power controller 220 will implement for controlling the auxiliary machine 104 based on the corresponding state of the current state column 902 and/or the corresponding input or condition in the input or condition column 904. In some examples, other machines of the example machine configuration may be implemented.

In the example of row 1, the current state of the example machine configuration may be any state (e.g., any one of the states in column 902 of rows 3-8). In this example of FIG. 9, if the power controller 220 identifies that the brake has been applied (e.g., via a brake sensor of the machine measurement devices 110) and that the example machine configuration is on-course according to the alignment monitor 212, power controller 220 may implement a braking or regenerative braking mode to charge the battery 122, as shown in column 906, row 1.

In the example of row 2, the current state of the example machine configuration may be any state (e.g., any one of the states in column 902 of rows 3-8). In this example of FIG. 9, if the example machine configuration is off-course according to the alignment monitor 212 and/or the trajectory controller 214, the power controller 220 implements a trajectory assist mode (as shown in column 906, row 2) and controls power to the ground engaging elements according to power outputs determined by the power assist controller 216.

In the example of row 3, the current state of the machine configuration is stopped, which may be determined by speed sensors and/or GPS receivers of the machine measurement devices 110. If it is determined that the example machine configuration is moving forward or is to move forward (e.g., identification of movement of the ground engaging elements in a forward direction by sensors of the machine measurement devices 110 and/or input received via a user interface 116), the power controller 220 implements a min-slip power mode to engage all wheels for traction and minimum slip, as shown in column 906, row 3.

In the example of row 4 of FIG. 9, the power controller 220 is controlling power to the ground engaging elements in a min-slip mode. If a decline is detected (e.g., via an inclinometer or other sensor(s) of the machine devices 110 or the path identifier 210), the power controller 220 may then disengage the power to the one or more ground engaging elements of the auxiliary machine 104. The ground engaging elements may then be in neutral mode (shown in column 906, row 4) while traversing the decline. In some examples, the next state in row 4 may be a regenerative braking mode to charge the battery 122 and slow the machine configuration 100. In such examples, the degree of the downhill slope (e.g., detected by an inclinometer of the machine devices 110) may determine whether the power controller 220 implements the regenerative braking mode or the free-wheel mode (e.g., steep slope=regenerative braking, gradual slope=free-wheel).

In the example of row 5, if the power controller 220 is enabling the ground engaging elements to free-wheel in neutral mode, and a decline is no longer detected (e.g., the machine devices 110 or the path identifier 210 detects flat terrain relative to the trajectory of the example machine configuration), the power controller 220 may then control the power to the ground engaging elements in min-slip mode (as shown in column 906, row 5).

In the example of row 6, if the power controller 220 is in a trajectory assist mode (e.g., controlling power to the wheels based on instructions from the power assist controller to return the example machine configuration to a desired path), and the alignment monitor 212 determines that the example machine configuration is on-course (e.g., it has returned to within a threshold distance of a desired work path), then the power controller 220 may then control the power to the ground engaging elements using the power mode that was in use prior to implementing the trajectory assist mode (identified by "previous state" in column 906, row 6).

In the example of row 7, if the power controller 220 is implementing a braking (or regenerative braking) mode, and the machine measurement devices 110 (e.g., brake sensors) indicates that a brake has been released or is to be released, then the power controller 220 may then control the power to the ground engaging elements using the power mode that was in use prior to implementing the braking (or regenerative braking) mode (identified by "previous state" in column 906, row 7).

In the example of row 8, if the power controller 220 is implementing a braking mode, and the machine measurement devices 110 (e.g., a speedometer) indicates that the example machine configuration is stopped, then the power controller 220 may stop all power to the ground engaging elements and enter a stopped mode (as shown in column 906, row 8). In some examples of row 8, the machine controller 120 may then discontinue control of the auxiliary machine 104 (e.g., as determined at block 816).

Figure 10:
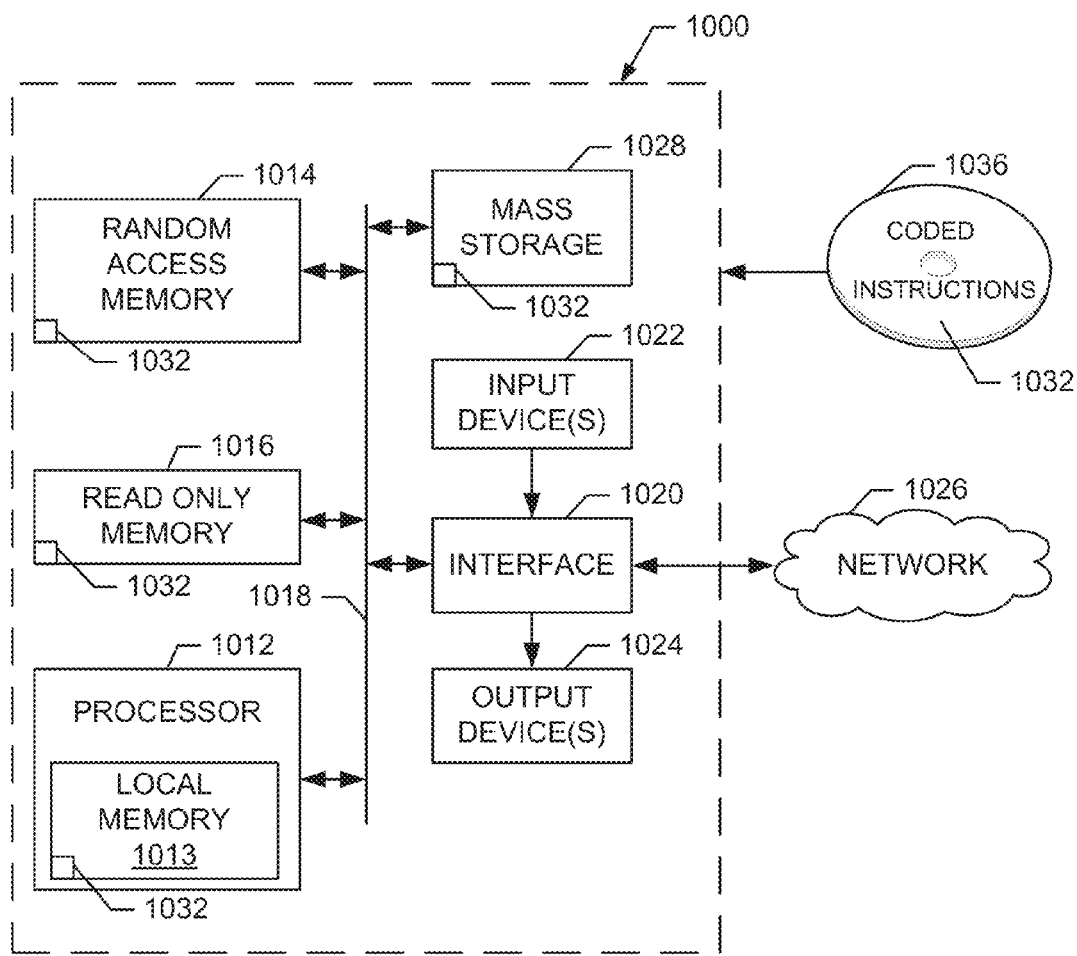
FIG. 10 is a block diagram of an example processor platform to execute or utilize the process of FIG. 8 and other methods to implement the example machine controller of FIG. 2.

FIG. 10 is a block diagram of an example processor platform 1000 capable of executing the instructions of FIG. 8 to implement the machine controller 120 of FIGS. 1 and/or 2. The processor platform 1000 can be, for example, a server, a personal computer, a mobile device (e.g., a cell phone, a smart phone, a tablet such as an iPad™), a personal digital assistant (PDA), an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIG. 8 may be stored in the mass storage device 1028, in the volatile memory 1014, in the non-volatile memory 1016, and/or on a removable tangible computer readable storage medium such as a CD or DVD.

From the foregoing, it will appreciate that the above disclosed methods, apparatus and articles of manufacture provide a machine controller to automatically control one or more machines of a machine configuration. The machine controller automatically controls power settings and turning of one or more wheels of the machines to ensure to keep the machine configuration on a desired path, execute maneuvers, and avoid collisions between the machines of the machine configuration. An auxiliary machine is disclosed to automatically provide additional power to a machine configuration and may include a hybrid electric configuration to conserve and/or generate energy for control of the machine configuration.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   determining a desired trajectory of an implement based at least in part on a host machine turning, a desired work path, or an alignment of the host machine and an auxiliary machine, the host machine and the auxiliary machine being coupled to the implement, a course of the auxiliary machine being independently adjustable relative to a course of the host machine, wherein the implement is to be connected in series to the host machine on a first side of the implement and to the auxiliary machine on a second side of the implement to enable the host machine to provide a pulling force to the implement and the auxiliary machine to provide a pushing force to the implement;

determining a first actual trajectory of the implement;

comparing the desired trajectory of the implement to the first actual trajectory of the implement; and when the first actual trajectory does not satisfy a threshold of the desired trajectory, changing the course of the auxiliary machine to enable a second actual trajectory of the implement to satisfy the threshold of the desired trajectory, the course of the auxiliary machine being different than a course of the host machine.

2. A method according to claim 1, wherein changing the course of the auxiliary machine includes controlling at least one of power to a ground engaging element of the auxiliary machine or turning the ground engaging element of the auxiliary machine.

3. A method according to claim 2, wherein the ground engaging element is a first ground engaging element, further including a second ground engaging element, the second ground engaging element being controlled by regenerative braking.

4. A method according to claim 3, wherein the regenerative braking is to slow a traveling rate of the auxiliary machine and charge a battery associated with the auxiliary machine.

5. A method according to claim 1,
wherein comparing the desired trajectory of the implement to the first actual trajectory includes identifying whether at least one of a distance from the host machine or a distance from the auxiliary machine satisfies a threshold of an expected location relative to the desired trajectory.

6. A method according to claim 5, wherein the distance is identified by a proximity sensor on at least one of the host machine, the implement, or the auxiliary machine.

7. A method according to claim 1, further including, when the first actual trajectory does not satisfy the threshold of the desired trajectory, calculating a correction path to enable the second actual trajectory of the implement to satisfy the threshold of the desired trajectory.

8. A method according to claim 1, wherein the implement includes at least one of a field plow, a cultivator, a tiller, a planter, or a seeder.

9. An apparatus comprising:
a path identifier to determine a desired trajectory of an implement, the implement being coupled to a host machine and an auxiliary machine, a course of the auxiliary machine being independently adjustable relative to a course of the host machine, the path identifier to determine a first actual trajectory of the implement, wherein the implement is to be connected in series to the host machine on a first side of the implement and to the auxiliary machine on a second side of the implement to enable the host machine to provide a pulling force to the implement and the auxiliary machine to provide a pushing force to the implement; and a controller to compare the desired trajectory of the implement to the first actual trajectory of the implement, when the first actual trajectory does not satisfy a threshold of the desired trajectory, the controller to change the course of the auxiliary machine to enable a second actual trajectory of the implement to satisfy the threshold of the desired trajectory, the course of the auxiliary machine being different than a course of the host machine.

10. An apparatus according to claim 9, wherein the controller is to change the course of the auxiliary machine by controlling at least one of power to a ground engaging element of the auxiliary machine or turning the ground engaging element of the auxiliary machine.

11. An apparatus according to claim 10, wherein the ground engaging element includes a first ground engaging element, further including a second ground engaging element, the controller to provide power to the first ground engaging element and to control the second ground engaging element by regenerative braking.

12. An apparatus according to claim 11, wherein the regenerative braking is to slow a traveling rate of the auxiliary machine and charge a battery associated with the auxiliary machine.

13. An apparatus according to claim 9, wherein the controller is to compare the desired trajectory of the implement to the first actual trajectory by identifying whether at least one of a distance from the host machine or a distance from the auxiliary machine satisfies a threshold of an expected location relative to the desired trajectory.

14. An apparatus according to claim 13, further including a proximity sensor to identify the distance, the proximity sensor being on at least one of the host machine, the implement, or the auxiliary machine.

15. An apparatus according to claim 9, wherein, when the first actual trajectory does not satisfy the threshold of the desired trajectory, the controller to calculate a correction path to enable the second actual trajectory of the implement to satisfy the threshold of the desired trajectory.

16. An apparatus according to claim 9, wherein the implement includes at least one of a field plow, a cultivator, a tiller, a planter, or a seeder.

17. The apparatus of claim 9, wherein the host machine includes first steering components to change the course of the host machine and the auxiliary machine includes second steering components to change the course of the auxiliary machine.

18. The apparatus of claim 9, wherein the auxiliary machine includes first steering components to control first wheels of the auxiliary machine and second steering components to control second wheels of the auxiliary machine, the first wheels being independently turnable relative to the second wheels, the second wheels being independently turnable relative to the first wheels.

19. The apparatus of claim 9, wherein the host machine operates as a master vehicle and the auxiliary machine operates as a slave vehicle.

20. The apparatus of claim 9, wherein the path identifier is to determine the desired trajectory of the host machine in response to an operator input received.

21. The apparatus of claim 9, wherein the auxiliary machine is a first auxiliary machine, further including a second auxiliary machine coupled to the host machine, when the first actual trajectory does not satisfy the threshold of the desired trajectory, the controller to change the course of at least one of the first auxiliary machine or the second auxiliary machine to enable the second actual trajectory of the implement to satisfy the threshold of the desired trajectory.

22. The apparatus of claim 21, wherein the course of the first auxiliary machine is independently adjustable relative to a course of the second auxiliary machine.

23. A tangible computer readable storage medium comprising instructions that when executed cause a machine to at least:
- determine a desired trajectory of an implement based at least in part on a host machine turning, a desired work path, or an alignment of the host machine and an auxiliary machine, a course of the auxiliary machine being independently adjustable relative to a course of the host machine, wherein the implement is to be connected in series to the host machine on a first side of the implement and to the auxiliary machine on a second side of the implement to enable the host machine to provide a pulling force to the implement and the auxiliary machine to provide a pushing force to the implement;
- determine a first actual trajectory of the implement;
- compare the desired trajectory of the implement to the first actual trajectory of the implement; and
- when the first actual trajectory does not satisfy a threshold of the desired trajectory, change the course of the auxiliary machine to enable a second actual trajectory of the implement to satisfy the threshold of the desired trajectory, the course of the auxiliary machine being different than a course of the host machine.

24. A storage medium according to claim 23, wherein the instructions when executed cause the machine to change the course of the auxiliary machine by controlling at least one of power to a ground engaging element of the auxiliary machine or turning the ground engaging element of the auxiliary machine.

25. A storage medium according to claim 24, wherein the ground engaging element includes a first ground engaging element, further including a second ground engaging element, the instructions, when executed, cause the machine to provide power to the first ground engaging element and control the second ground engaging element by regenerative braking.

26. A storage medium according to claim 25, wherein the regenerative braking is to slow a traveling rate of the auxiliary machine and charge a battery associated with the auxiliary machine.

* * * * *